(12) United States Patent
Xu et al.

(10) Patent No.: US 11,129,082 B2
(45) Date of Patent: Sep. 21, 2021

(54) METHOD OF ROUTE CONSTRUCTION OF UAV NETWORK, UAV AND STORAGE MEDIUM THEREOF

(71) Applicant: Beijing University of Posts and Telecommunications, Beijing (CN)

(72) Inventors: Wenjun Xu, Beijing (CN); Chunlei Huang, Beijing (CN); Zhi Zhang, Beijing (CN); Shaosheng Li, Beijing (CN); Ping Zhang, Beijing (CN); Jiaru Lin, Beijing (CN)

(73) Assignee: Beijing University of Posts and Telecommunications, Beijing (CN)

( * ) Notice: Subject to any disclaimer, the term of this patent is extended or adjusted under 35 U.S.C. 154(b) by 0 days.

(21) Appl. No.: 16/939,254

(22) Filed: Jul. 27, 2020

(65) Prior Publication Data
US 2020/0359297 A1    Nov. 12, 2020

Related U.S. Application Data

(63) Continuation of application No. PCT/CN2019/113936, filed on Oct. 29, 2019.

(30) Foreign Application Priority Data

Dec. 28, 2018  (CN) .......................... 201811623953.8

(51) Int. Cl.
*H04W 40/22* (2009.01)
*H04W 40/24* (2009.01)
(Continued)

(52) U.S. Cl.
CPC .......... *H04W 40/22* (2013.01); *B64C 39/024* (2013.01); *G05B 13/027* (2013.01); *H04W 40/08* (2013.01);
(Continued)

(58) Field of Classification Search
CPC ........ B64C 2201/027; B64C 2201/122; B64C 39/024; G05B 13/027; H04L 45/08;
(Continued)

(56) References Cited

U.S. PATENT DOCUMENTS 9,949,138 B2 *   4/2018  Zavesky ............ H04B 7/18506
10,304,343 B2 *  5/2019  Mustafic ............. G08G 5/0034
(Continued)

FOREIGN PATENT DOCUMENTS

CN    105491564 A    4/2016
CN    107517158 A    12/2017
(Continued)

OTHER PUBLICATIONS

First Office Action in counterpart Chinese Application No. 201811623953.8, dated Aug. 2, 2019.
(Continued)

*Primary Examiner* — Tan H Trinh
(74) *Attorney, Agent, or Firm* — Westbridge IP LLC

(57) ABSTRACT

A method of route construction of an unmanned aerial vehicle (UAV) network includes: obtaining transmission information of the UAV network; determining a relay set from the UAV network based on the transmission information; wherein, the relay set includes at least one UAV; determining environment state parameters according to the transmission information and the information of the relay set; inputting the environment state parameters into a Deep Q-Learning network (DQN) to obtain an accumulated reward corresponding to each UAV; and selecting a UAV with the largest accumulated reward as a target UAV. This disclosure also discloses a UAV and computer readable storage medium that can be used to construct routes for a UAV network.

19 Claims, 8 Drawing Sheets

(51) Int. Cl.
*H04W 40/28* (2009.01)
*H04W 40/20* (2009.01)
*H04W 40/16* (2009.01)
*H04W 40/08* (2009.01)
*B64C 39/02* (2006.01)
*G05B 13/02* (2006.01)
*H04W 84/06* (2009.01)

(52) U.S. Cl.
CPC ............ *H04W 40/16* (2013.01); *H04W 40/20* (2013.01); *H04W 40/246* (2013.01); *H04W 40/28* (2013.01); *B64C 2201/027* (2013.01); *B64C 2201/122* (2013.01); *H04W 84/06* (2013.01)

(58) Field of Classification Search
CPC ..... H04W 40/08; H04W 40/12; H04W 40/16; H04W 40/20; H04W 40/22; H04W 40/246; H04W 40/28; H04W 52/18; H04W 52/46; H04W 84/047; H04W 84/06; Y02D 30/70
USPC .................... 455/67.11, 67.16, 12.1, 13.1
See application file for complete search history.

(56) References Cited

U.S. PATENT DOCUMENTS

| | | | | |
|---|---|---|---|---|
| 10,531,240 | B1* | 1/2020 | Sciancalepore | H04W 4/029 |
| 2017/0069214 | A1* | 3/2017 | Dupray | G08G 5/0013 |
| 2017/0195048 | A1* | 7/2017 | Sham | H04B 10/1129 |
| 2017/0195694 | A1* | 7/2017 | Sham | H04N 21/482 |
| 2018/0035306 | A1 | 2/2018 | Zavesky et al. | |
| 2019/0014488 | A1* | 1/2019 | Tan | G06N 3/084 |
| 2019/0061147 | A1* | 2/2019 | Luciw | B25J 9/163 |
| 2019/0116560 | A1* | 4/2019 | Naderializadeh | H04W 52/346 |
| 2019/0278897 | A1* | 9/2019 | Zhang | G06Q 50/30 |
| 2019/0289613 | A1* | 9/2019 | Fanelli | H04W 28/26 |
| 2019/0295426 | A1* | 9/2019 | Nilsson | G08G 5/0043 |
| 2020/0169317 | A1* | 5/2020 | Rahmes | G08G 5/0008 |
| 2020/0192348 | A1* | 6/2020 | Koziol | G08G 5/0069 |
| 2021/0074166 | A1* | 3/2021 | Chang | H04W 4/00 |
| 2021/0211371 | A1* | 7/2021 | Ceccarelli | H04L 45/08 |
| 2021/0219384 | A1* | 7/2021 | Liao | G06N 3/0454 |

FOREIGN PATENT DOCUMENTS

| | | |
|---|---|---|
| CN | 107911299 A | 4/2018 |
| CN | 108616302 A | 10/2018 |
| CN | 108770003 A | 11/2018 |
| CN | 108833049 A | 11/2018 |
| CN | 108900419 A | 11/2018 |
| CN | 109803344 A | 5/2019 |

OTHER PUBLICATIONS

International Search Report in corresponding PCT Application No. PCT/CN2019/113936, dated Jan. 17, 2020.

* cited by examiner

METHOD OF ROUTE CONSTRUCTION OF UAV NETWORK, UAV AND STORAGE MEDIUM THEREOF

CROSS-REFERENCE TO RELATED APPLICATIONS

The present application is a continuation of PCT application PCT/CN2019/113936 entitled "Method of Route Construction of UAV Network, UAV and Storage Medium thereof" filed on Oct. 29, 2019, which claims priority of Chinese patent application CN201811623953.8, filed on Dec. 28, 2018, the entire contents of which are incorporated herein by reference.

TECHNICAL FIELD

The present disclosure relates to wireless communications, in particular to a method of route construction of an Unmanned aerial vehicles (UAVs) network, a UAV and a storage medium thereof.

BACKGROUND

UAVs now have been widely used in emergency cases and rescue missions due to their advantages such as great flexibility, being easy to deploy, having small channel attenuations and so on. Moreover, UAVs have now been widely used as auxiliary nodes in conventional communication networks. Relay/route selection and power control are key technologies in a UAV network.

SUMMARY

One or more examples of the present disclosure provides a method of route construction of a UAV network implemented by a UAV, which may include:
  obtaining transmission information of the UAV network;
  determining a relay set of the UAV from the UAV network based on the transmission information; wherein, the relay set includes at least one UAV;
  determining environment state parameters of the UAV network according to the transmission information and information of the relay set;
  inputting the environment state parameters into a Deep Q-Learning Network (DQN) to obtain an accumulated reward corresponding to each target candidate of the UAV; and
  selecting the target candidate with the largest accumulated reward as a next-hop target of the UAV.

According to some examples of the present disclosure, determining a relay set of UAV $u_i$ from the UAV network may include:
  taking a distance increasing ratio $R_{ij}^{dist+}$ as a measurement standard for each of the other UAVs $u_j$ of the UAV network;
  selecting M UAVs $u_i^m$, m=1, 2, . . . , M with the lowest $R_{ij}^{dist+}$ to form the relay set $R_i=\{u_i^m|m=1, 2, \ldots, M\}$ of UAV $u_i$.

According to some examples of the present disclosure, the distance increasing ratio $R_{ij}^{dist+}$ may be determined according to:

$$R_{ij}^{dist+} = \frac{(D_{ij}^{u2r} + D_j^{u2b} - D_i^{u2b})}{D_i^{u2b}}$$

wherein, $D_{ij}^{u2r}$ represents the distance between UAV $u_i$ and UAV $u_j$; $D_i^{u2b}$ represents the distance between UAV $u_i$ and the base station; and $D_j^{u2b}$ represents the distance between the UAV $u_j$ and the base station.

According to some other examples of the present disclosure, determining a relay set from the UAV network may include:
  determining a signal to interference plus noise ratio (SINR) of the $n^{th}$ air-to-air channel from UAV $u_i$ to another UAV $u_j$ and a SINR of the $n^{th}$ air-to-ground channel from UAV $u_i$ to the base station according to the transmission information;
  determining a channel capacity improvement space of UAV $u_i$ with regard to each of the other UAVs $u_j$; and
  selecting M UAVs with the largest channel capacity improvement space as relay UAVs, wherein M is a predetermined number of relay UAVs.

According to some examples of the present disclosure, the SINR $sinr_{ij-n}^{uu}$ of the $n^{th}$ air-to-air channel from UAV $u_i$ to UAV $u_j$ may be determined according to:

$$sinr_{ij-n}^{uu} = \frac{h_{ij,n}^{uu} P_i^n}{\sum_{k \neq j, k \neq i} h_{ik,n}^{uu} P_i^n + P_n}$$

The SINR $sinr_{i-n}^{ub}$ of the $n^{th}$ air-to-ground channel from UAV $u_i$ to the base station may be determined according to:

$$sinr_{i-n}^{uu} = \frac{h_{i,n}^{ub} P_i^n}{\sum_{j \neq i} h_{j,n}^{ub} P_i^n + P_n}$$

wherein, $h_{ij,n}^{uu}$ represents the channel fading coefficient of the $n^{th}$ air-to-air channel from UAV $u_i$ to UAV $u_j$; $h_{i,n}^{ub}$ represents the channel fading coefficient of the $n^{th}$ air-to-ground channel from UAV $u_i$ to the base station; $P_i^n$ represents the transmission power of UAV $u_i$ on the $n^{th}$ air-to-air channel or on the $n^{th}$ air-to-ground channel; and $P_n$ is the noise power.

According to some examples of the present disclosure, the channel capacity improvement space may be determined according to:

$$c_i^{idle} = C(w, sinr_i^{max}) - C(w, sinr_i)$$

wherein, $C(w, sinr) = w \log(1+sinr)$ represents the Shannon formula; $sinr_i^{max}$ represents the SINR when UAV $u_i$ is transmitting with a maximum power $p_{max}$; $sinr_i$ is the SINR when UAV $u_i$ is transmitting with a power $P_i^t$.

According to some examples of the present disclosure, when UAV $u_i$ connects to the base station directly, the channel capacity improvement space may be $c_i^{idle}$. When UAV $u_i$ connects to UAV $u_j$, the channel capacity improvement space may be $\min(c_{i,j}^{idle}, c_j^{idle})$, which is the smaller value of the channel capacity from UAV $u_i$ to the relay UAV $u_j^m$ and the channel capacity from the relay UAV $u_j$ to the base station.

According to some examples of the present disclosure, the method may further include: training the DQN, which may include:
  initializing the DQN, starting the $t_{epi}^{th}$ training episode, initializing the number of training steps as t=1, and updating the environment state parameters $s_i^t$ of the UAV network;
  inputting the environment state parameters $s_i^t$ to the DQN which outputs an accumulated reward $Q(s_i, a_i)$ of each UAV, and performing a ε-greedy action selection; that is, selecting an action $a_i^t$ with the largest accumulated reward $Q(s_i, a_i)$ by probability 1−ε;

updating the environment state parameters $s_i^{t+1}$ based on the action $a_i^t$ selected, and determining a reward $r_i^t$ obtained after all UAVs take actions;

recording a set of tuples $(s_i^t, a_i^t, r_i^t, s_i^{t+1})$, i=1, 2, ..., I, and storing the set of tuples into an experience buffer;

sampling K sets of tuples $(s_{i,k}^t, a_{i,k}^t, r_{i,k}^t, s_{i,k+1}^{t+1})$, i=1, 2 .... I, k=1, 2 .... K from the experience buffer;

calculating an accumulated reward $y_{i,k}^t$ obtained; and if the training episode is terminated, restarting a new training episode, enabling $t_{epi} = t_{epi} + 1$, and returning to the beginning of a training episode; and if $t_{epi} > T_{epi}$, the training process is completed.

According to some examples of the present disclosure, initializing the DQN may include: initializing two DQNs, wherein one DQN is an evaluation network with parameters θ, and the other DQN is a target network with parameters θ'.

According to some examples of the present disclosure, the accumulated reward $y_{i,k}^t$ may be determined according to:

$$y_{i,k}^t = \begin{cases} r_{i,k}^t, & \text{if the } k+1^{th} \text{ transmission episode terminates} \\ r_{i,k}^t + \gamma \max Q'(s_{i,k}^{t+1}, a_{i,k}^{t+1}), & \text{else} \end{cases}$$

wherein, the condition that a transmission episode terminates is: the UAV updates the next-hop target, or the current transmission service is finished.

According to some examples of the present disclosure, the method may further include: carrying out a back propagation training on the parameters θ of the evaluation network of the DQN based on a mean square error $$\frac{\sum_{k=1}^{K} (y_{i,k}^t - Q(s_{i,k}^{t+1}, a_{i,k}^{t+1}))^2}{K}$$

of K sets of tuples; and performing a soft update on the target network of the DQN.

According to some examples of the present disclosure, the accumulated reward $y_{i,k}^t$ may be determined according to:

$$y_{i,k}^t = \begin{cases} r_{i,k}^t, & \text{if the } k+1^{th} \text{ training episode terminates} \\ r_{i,k}^t + \gamma \max Q(s_{i,k}^{t+1}, a_{i,k}^{t+1}), & \text{else} \end{cases}$$

wherein, the condition that the training episode terminates may include: a certain number of UAVs cannot meet the lowest requirement on the channel capacity requirement of the control instruction.

According to some examples of the present disclosure, the method may further include: performing a back propagation training on the DQN based on K sets of errors $(y_{i,k}^t - Q(s_{i,k}^{t+1}, a_{i,k}^{t+1}))^2$.

According to some examples of the present disclosure, the method may further include: inputting the environment state parameters into a Deep Deterministic Policy Gradient (DDPG) network to obtain transmission powers of the UAV on each channel.

According to some examples of the present disclosure, the method may further include: training the DDPG network, which includes:

initializing a Critical network and an Actor network of the DDPG network;

starting the $t_{epi}^{th}$ training episode, initializing the number of training steps as t=1, and updating the environment state parameters $s_i^t$ of the UAV network;

inputting the environment state parameters $s_i^t$ to the Actor network of the DDPG network which outputs a transmission power vector $\pi(s_i^t|\theta^u)$ of UAV $u_i$ on each channel, selecting an action $a_i^t$ based on the Actor network, and adding an exploration noise $N_i^t$;

updating the environment state parameters $s_i^{t+1}$ based on the action $a_i^t$ selected, and determining a reward $r_i^t$ after all UAVs take actions;

recording a set of tuples $(s_i^t, a_i^t, r_i^t, s_i^{t+1})$, i=1, 2, ..., I, and storing the set of tuples into an experience buffer;

sampling K sets of tuples $(s_{1,k}^t, a_{i,k}^t, r_{i,k}^t, s_{i,k}^{t+1})$, i=1, 2 .... I, k=1, 2 .... K from the experience buffer;

calculating an accumulated reward $y_{i,k}^t$; and if the training episode is terminated, restarting a new training episode, enabling $t_{epi} = t_{epi} + 1$, and returning to the beginning of a training episode; and if $t_{epi} > T_{epi}$, outputting the transmission powers of UAV $u_i$ on each channel.

According to some examples of the present disclosure, initializing a Critical network and an Actor network of the DDPG network may include: initializing two Critical networks, wherein, one Critical network is an evaluation network with parameters $\theta^Q$, and the other Critical network is a target network with parameters $\theta^{Q'}$; and initializing two Actor networks, wherein one Actor network is an evaluation network with parameters $\theta^u$, the other Actor network is a target network with parameters $\theta^{u'}$.

According to some examples of the present disclosure, calculating an accumulated reward $y_{i,k}^t$ may include: calculating $Q(s_{i,k}^t, a_{i,k}^t)$ based on the evaluation network of the Critic network, calculating $Q'(s_{i,k}^t, a_{i,k}^t)$ and the accumulated reward $y_{i,k}^t$ based on the evaluation network of the Critic network; wherein, the accumulated reward $y_{i,k}^t$ may be determined according to:

$$y_{i,k}^t = \begin{cases} r_{i,k}^t, & \text{if the } k+1^{th} \text{ transmission episode terminates} \\ r_{i,k}^t + \gamma \max Q'(s_{i,k}^{t+1}, a_{i,k}^{t+1}), & \text{else} \end{cases}$$

wherein, the condition that a transmission episode terminates may include: the UAV updates the next-hop target, or the current transmission service is finished.

According to some examples of the present disclosure, the method may further include: performing a back propagation training on the parameters θ of the evaluation network of the Critic network based on a mean square error $$\frac{\sum_{k=1}^{K} (y_{i,k}^t - Q(s_{i,k}^{t+1}, a_{i,k}^{t+1}))^2}{K}$$

of K sets of tuples, and updating the parameters $\theta^u$ of the evaluation network of the Actor network using a gradient descent method; and performing a soft update on the target networks of the Critic network and the Actor network.

According to some examples of the present disclosure, the accumulated reward $y_{i,k}^t$ may be determined according to:

$$y_{i,k}^t = \begin{cases} r_{i,k}^t, \text{ if the } k+1^{th} \text{ training episode terminates} \\ r_{i,k}^t + \gamma \max Q(s_{i,k}^{t+1}, a_{i,k}^{t+1}), \text{ else} \end{cases}$$

wherein, the condition that the training episode terminates may include: a certain number of UAVs cannot meet the lowest requirements on the channel capacity of the control instruction.

According to some examples of the present disclosure, the method may further include: performing a back propagation training on the Critic network based on K sets of errors $(y_{i,k}^t - Q(s_{i,k}^{t+1}, a_{i,k}^{t+1}))^2$; updating the Actor network by a gradient descent method; and performing a soft update on the Critic network and the Actor network.

According to some examples of the present disclosure, the method may further include: training the DQN and the DDPG network, which includes:

initializing the DQN, and the Critic network and the Actor network of the DDPG network;

starting the $t_{epi}^{th}$ training episode, initializing the number of training steps as t=1, and updating the environment state parameters $s_i^t$ of the UAV network;

inputting the environment state parameters $s_i^t$ to the DQN which outputs an estimate accumulated reward $Q(s_i,a_i)$ of each UAV, and performing a E-greedy action selection; that is, selecting an action $a_i^t$ with the largest accumulated reward $Q(s_i,a_i)$ by probability 1−ε;

inputting the environment state parameters $s_i^t$ to the Actor network which outputs a transmission power vector $\pi(s_i^t|\theta^\mu)$ of UAV $u_i$ on each channel, selecting an action $a_i^t$ based on the Actor network, and adding an exploration noise $N_i^t$;

updating the environment state parameters $s_i^{t+1}$ based on the action $a_i^t$ selected, and determining a reward $r_i^t$ after all UAVs take actions;

recording a set of tuples $(s_i^t, a_i^t, r_i^t, s_i^{t+1})$, i=1, 2, ..., I, and storing the set of tuples into an experience buffer;

sampling K sets of tuples $(s_{i,k}^t, a_{i,k}^t, r_{i,k}^t, s_{i,k}^{t+1})$, i=1, 2 .... I, k=1, 2 .... K from the experience buffer;

calculating a public accumulated reward $y_{i,k}^t$; and if the training episode is terminated, restarting a new training episode, enabling $t_{epi}=t_{epi}+1$, returning to the beginning of a training episode; and if $t_{epi} > T_{epi}$, the training is terminated.

According to some examples of the present disclosure, the method may further include:

determining a reward $r_{DQN}=r_{total}+r_{relay}$ of the DQN;

determining a reward $r_{DDPG}=r_{total}+r_{power}$ of the DDPG network; wherein, $r_{total}$ represents the ratio of an actually uplink transmission rate to a total service request rate; $r_{relay}$ represents a special reward obtained from the relay selected by the DQN; $r_{power}$ represents a special reward obtained from the power selected by the DDPG network; and determining the public accumulated reward according to the reward of the DQN, the reward of the DDPG, the special reward obtained from the relay selected by the DQN, and the special reward obtained from the power selected by the DDPG network.

According to some examples of the present disclosure, the public accumulated reward may be determined by:

calculating a total service request rate $r_{total}=\Sigma_i r_i$ and a total channel capacity $c_{total}=\Sigma_i \Sigma_n c_{i,n}$ of the UAV network;

determining a total unsatisfied service rate $c_{total}^{outage}=\Sigma_i \max(0, c_{total}^{min} - \Sigma_n c_{i,n}^{uplink})$ and a minimum service request rate $c_{total}^{min}=\Sigma_i c_i^{min}$; and determining the public accumulated reward $r_i$ as $$r = \max\left(0, \max\left(1, \frac{r_{total}}{c_{total}}\right) - \min\left(0, \lambda\left(\frac{c_{total}^{outage}}{c_{total}^{min}}\right)\right)\right),$$

wherein, λ is a penalty coefficient.

According to some examples of the present disclosure, the transmission information includes: at least one of positions of the UAVs, a fading coefficient of each air-to-air channel between each two UAVs, a fading coefficient of each air-to-ground channel between each UAV and the base station, a noise power, a service request rate of each UAV, a service rate carried by each UAV, and a transmission power of the UAV.

One or more examples of the present disclosure also provides a UAV, which may include:

one or more processors, one or more memories, and a communication bus configured to couple the one or more processors and the one or more memories; wherein the one or more memories store one or more instructions, and when executed by the one or more processors, the instructions cause the one or more processors to perform the above method.

One or more examples of the disclosure provide a non-transitory computer-readable storage medium, which includes one or more instructions, when executed by one or more processors, cause the one or more processors to perform the above method.

As can be seen from the technical schemes above, the method of route construction of the UAV network and the UAV provided by the present disclosure can select a next-hop target automatically according to the transmission information of the UAV network. Thereby the topology of the UAV network can be constructed. In this way, the capability of the UAV network can be improved, the coverage range of the UAV network can be effectively expanded and the transmission quality of the UAV network can also be greatly improved. In addition, the UAV can determine the transmission power automatically according to the transmission information of the UAV network. Therefore, continuous power control can be achieved, and the network transmission quality may be improved effectively.

Furthermore, two heterogeneous models in deep learning, namely the DQN and the DDPG network, are utilized to model the communication problems, and are jointly trained to realize a self-decision. The DQN is a discrete control model. By utilizing the DQN, a next-hop target can be determined, a transmission link can be established and a network topology can be constructed based on the transmission information and the requirements of each UAV. The DDPG network is a continuous control model. By utilizing the DDPG network, a fine-grained power control can be realized based on the environment state and the requirements of each UAV.

BRIEF DESCRIPTION OF DRAWINGS

In order to illustrate the examples of the present disclosure more clearly, reference will now be made to the accompanying drawings, which are incorporated in and constitute a part of this specification.

DETAILED DESCRIPTION OF THE EMBODIMENTS

Figure 1:
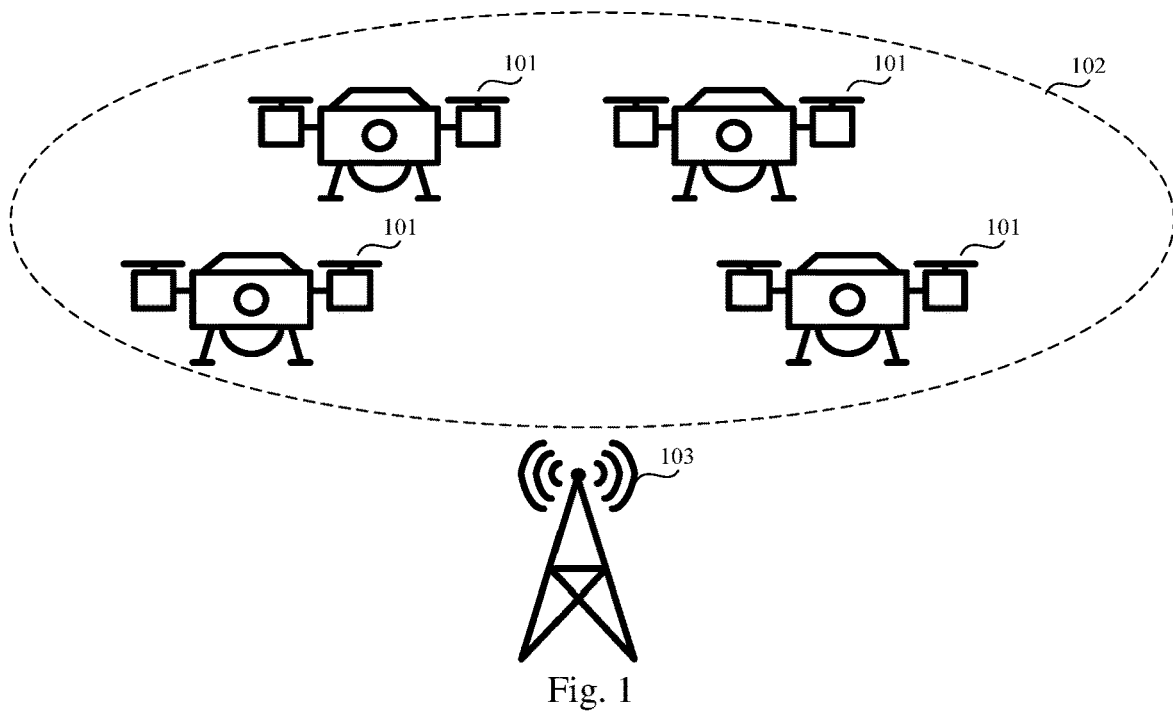
FIG. 1 is a schematic diagram illustrating the internal structure of a UAV network system 100 according to one or more examples of the present disclosure.

To further clarify the objects, aspects and advantages of the present application, a more particular description of the application will be rendered by reference to specific examples thereof which are illustrated in the appended drawings.

It should be noted that all expressions using "first" and "second" in this disclosure are to distinguish two different entities or two non-identical parameters with a same name. It can be seen that the term "first" and "second" is only used for the convenience of statement. They should not be interpreted as restrictions to embodiment.

To further clarify the objects, aspects and advantages of the present application, a more particular description of the application will be rendered by reference to specific examples thereof which are illustrated in the appended drawings.

For convenience of description, two deep reinforcement learning networks are briefly described in advance.

DQN is one of deep reinforcement learning methods, which can be used to select automatically an optimal action a based on current environment state s. That is, DQN can make decisions automatically. Wherein, a represent discrete actions, those are, limited actions that can be enumerated. In reinforcement learning methods, an award r can be obtained by taking an action a in a current environment state s, and then an accumulated award Q(s,a) of subsequent actions selected at this time can be estimated. That is, using environment state s as the input, the accumulated reward $Q(s, a_i)$ of different actions $a_i$ taken can be obtained as the output of the deep learning neural network, and the network may select an action $a_i$ with the largest $Q(s, a_i)$. That is, a decision can be made based on the DQN model.

The DDPG network is one of deep reinforcement learning methods, wherein, a represent continuous actions, i.e. with continuous range of values, which can be used to benefit a fine-grained power control. The DDPG network is different from the DQN and is a strategy gradient method, which includes an Actor network and a Critic network, wherein the Actor network takes a state s as an input, fits a strategy π, and outputs an action a=π(s), namely, the Actor network selects an action a directly based on a current state s. The Critic network takes status s and actions a as inputs and outputs an accumulated reward Q(s,a), which may be used to evaluate the effectiveness of action a under state s. That is, the Actor network is used for selecting an action, the Critic network is used for estimating the reward of the action so as to evaluate the superiority and inferiority of the action. Through the cooperation of the two networks, the decision effect can be continuously improved and self-decision can be finally realized.

Based on the study on the technology of the UAV network, the topology and interferences of the UAV network will change dynamically due to the influence of line-of-sight channels, limited communication resources, malicious interference and high dynamic of UAV network. On the other hand, the UAV network has strict requirements on transmission reliability. The contradiction between the above two aspects have made the transmission quality and reliability of the UAV network become one of the bottleneck of constructing a large-scale UAV network. Therefore, how to construct the routes of UAVs in a UAV network has become an urgent problem of the UAV network.

In order to solve the problem, such as route construction which is difficult in the UAV network, the present disclosure provides a method of route construction of a UAV network.

First of all, the system implementing the method of route construction of the UAV network will be briefly described. FIG. 1 is a schematic diagram illustrating the internal structure of a UAV network system 100 according to one or more examples of the present disclosure. As shown in FIG. 1, the UAV network system 100 includes: a UAV network 102 which includes a plurality of UAVs 101 and at least one base station 103.

In the UAV network system 100, the plurality of UAVs 101 can share N channels or N communication resource blocks $C_n$(n=1, 2, 3, . . . N), and there may exist a multiplexing on the resource blocks.

In addition, information interactions may be carried out between the UAV network 102 and the base station 103 to transmit transmission information of UAVs 101.

Further, each of UAVs 101 may include at least one of a DQN or a DDPG network, so as to realize self-decisions on transmission route or transmission power.

Figure 2:
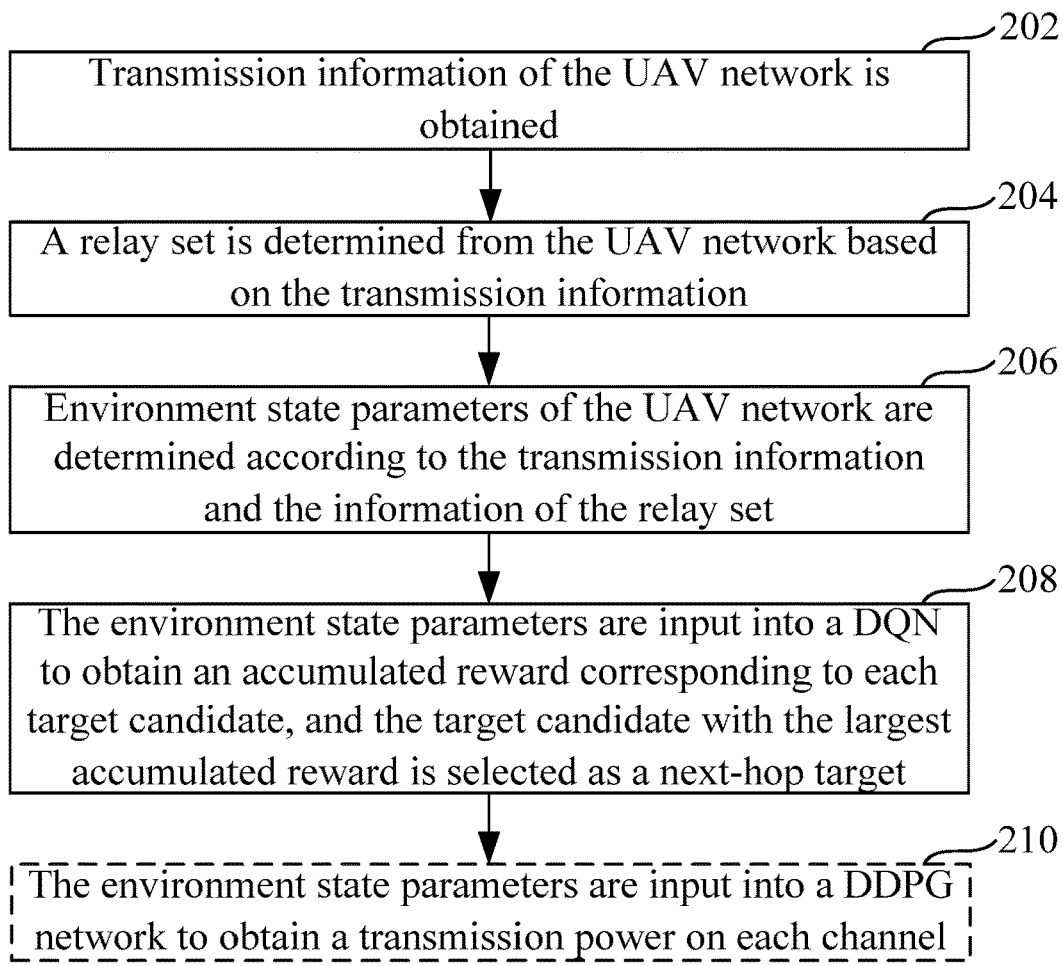
FIG. 2 is a schematic diagram illustrating the flowchart of the method of route construction of the UAV network according to one or more examples of the present disclosure.

Based on the UAV network system 100, one or more examples of the disclosure provide a method of route construction of a UAV network. This method can be implemented by each UAV 101 in the UAV network 102 respectively. Specifically, FIG. 2 is a schematic diagram for illustrating the above method, which may include the following steps.

In block 202, transmission information of the UAV network is obtained.

In some examples of the present disclosure, the transmission information may include: at least one of positions of the UAVs, a fading coefficient of each air-to-air channel between each two UAVs, a fading coefficient of each air-to-ground channel between each UAV and the base station, a noise power, a service request rate of each UAV, a service rate carried by each UAV or a transmission power of each UAV.

According to some examples of the present disclosure, each UAV 101 in the UAV network 102 can interact information with the base station 103 to obtain the transmission information of the UAV network.

At block 204, a relay set of the UAV is determined from the UAV network based on the transmission information; wherein, the relay set includes at least one UAV.

In some examples of the present disclosure, by the above step, the UAV network 102 can select a subset of UAVs as the relay set heuristically from the UAV network 102. Wherein, each UAV in the relay set can be called as a relay UAV. Wherein, the method for selecting UAVs to form the relay set will be described in detail later.

At block 206, environment state parameters of the UAV network are determined according to the transmission information and the information of the relay set.

In some examples of the present disclosure, the information of the relay set may include information of each relay UAV in the relay set.

At block 208, the environment state parameters are input into a DQN to obtain an accumulated reward corresponding to each target candidate of the UAV, and the target candidate with the largest accumulated reward is selected as a next-hop target; wherein, the target candidate may be a relay UAV or a base station.

In some examples of the present description, the next-hop target may be considered as an action $a_i^{DQN}$ taken by the DQN.

By the above steps at blocks 202-208, each UAV may select a relay or a route by itself. Therefore, route construction of the UAV network may be implemented. In addition, in the method above, there is no need to set any UAV as fixed relay nodes, therefore, the utilization efficiency of the UAVs in the UAV network may be greatly improved.

After the route of the UAV network is constructed, each UAV may further execute the step at the following block 210 to determine its transmission power.

At block 210, the environment state parameters are input into a DDPG network to obtain a transmission power of the UAV on each channel.

In one or more examples of the present disclosure, the transmission power can be considered as an action $a_i^{DDPG}$ taken by the DDPG network.

Further, some examples of the present disclosure may further include a training process on the DQN so as to update the route of the UAV network in real time. Moreover, some examples of the present disclosure may further include a training process on the DDPG network so as to update the transmission power of each UAV in real time.

Moreover, some other examples of the present disclosure may further include a combined training process performed on both the DQN and the DDPG network, so as to update the route of UAV network and the transmission power of each UAV simultaneously.

Specifically, in some examples of the present disclosure, while performing the training process on the DQN and/or the DDPG network, the environment state parameters of the UAV network may be first updated. That is, the environment state parameters of the UAV network are obtained in real time. Then, the reward of an action and an action record are obtained according to the updated environment state parameters of the UAV network. Finally, the DQN and/or the DDPG network are trained according to the reward and the action record.

Figure 3:
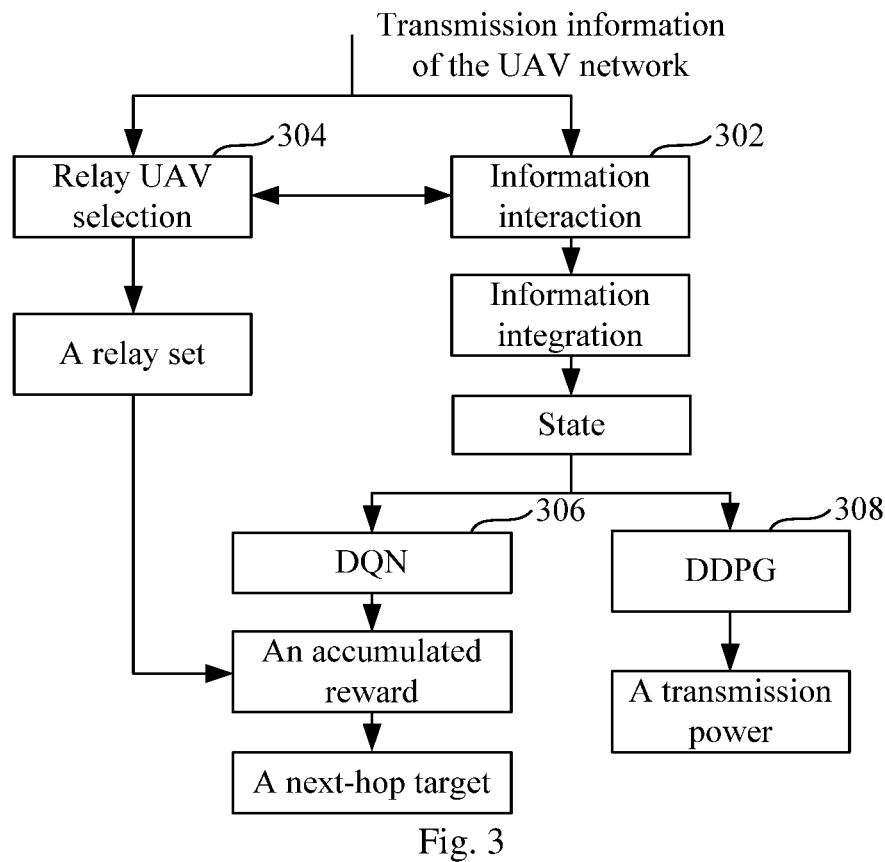
FIG. 3 is a schematic diagram illustrating the architecture of the deep learning model and the workflow used in the method of route construction of the UAV network according to one or more examples of the present disclosure.

The method of route construction of the UAV network will be described in detail with examples. FIG. 3 is a schematic diagram illustrating the architecture of the deep learning model and the workflow used in the method of route construction of the UAV network according to one or more examples of the present disclosure.

In this example, it is assumed that there are I UAVs $u_i$(i=1, 2, . . . , I) in the UAV network. These I UAVs $u_i$ share N channels or N communication resource blocks $c_n$(n=1, 2 . . . , N). Multiplexing on these channels or communication resource blocks may exist.

In addition, it is assumed that the number of UAVs selected in the relay set is M.

In addition, based on the information of the UAV, the maximum transmission power $P_i^{max}$ of the UAV may be obtained. Moreover, the minimum channel capacity $C_i^{max}$ required by a control instruction may also be obtained. It is also assumed that the DQN network and the DDPG network are trained.

At block 302, the UAV network obtains transmission information through information interactions with the base station.

According to some other examples of the present disclosure, the transmission information may include: at least one of positions $P_i$ of the UAVs, a fading coefficient $h_{ij,n}^{uu}$ of the $n^{th}$ air-to-air channel between UAV $u_i$ to UAV $u_j$, fading coefficient $h_{i,n}^{ub}$ of the $n^{th}$ air-to-ground channel between UAV $u_i$ and the base station, a noise power $P_n$, a service request rate $r_i$ of UAV $u_i$, a service rate $r_i^{relay}$ carried by UAV $u_i$ or a transmission power $P_i^t$ of UAV $u_i$. After the transmission information is obtained, the transmission information would be added in the deep reinforcement learning environment $s_i$.

It should be noted that in examples of the present disclosure, the information interaction procedure may be implemented by conventional information interaction methods used in the conventional communication systems. No additional functions need to be added on the conventional communication systems.

At block 304, each UAV in the UAV network may select a subset of UAVs from the UAVs in the UAV network as its relay set R={$u_i^m$|m=1, 2 . . . , M} based on the transmission information interacted inside the UAV network; wherein, i is the number corresponding to the $m^{th}$ relay UAV. In addition, at the moment t, each UAV $u_i$ will add the information of its relay set R={$u_i^m$|m=1, 2 . . . , M} into its deep reinforcement learning environment $s_i^t$.

Specifically, the deep reinforcement learning environment may include the DQN and the DDPG network, wherein the DQN and the DDPG network both have been trained. It should be noted that the method for selecting the relay set will be described in detail later.

At block 306, for each UAV $u_i$, the environment state parameters $s_i$ are inputted into the DQN, which outputs accumulated rewards Q($s_i,a_i|a_i \in A_i$) corresponding to different target candidates $A_i$={R,BS}. Wherein, R={$u_i^m$|m=1, 2 . . . , M} refers to the relay set; and BS refers to the base station. Further, the target candidate $a_i \in A_i$ with the largest accumulated reward $Q(s_i,a_i|a_i \in A_i)$ is selected as the next-hop target $$a_i = \max_{a_i} Q(s_i, a_i | a_i \in A_i)$$

of the UAV $u_i$.

At block 308, for each UAV $u_i$, the environment state parameters $s_i$ are inputted into the DDPG network, which outputs a transmission power $P_i^n$ of UAV $u_i$ on channel n.

As influenced by the next-hop target and transmission power selected by each UAV, the environment state parameters would be changed into $s_i^{t+1}$. Then, each UAV would repeat the steps at blocks 302-308 to ensure communication.

The above steps would ensure the convergence of the DQN and the DDPG network. In the above method, the DQN and the DDPG network can also share the rewards. Therefore, the simplification and universality of the two deep reinforcement learning models can be ensured.

The above steps can accomplish the tasks of relay selection and power distribution of each UAV in the UAV network, so that route construction of a UAV network can be realized based on heterogeneous deep reinforcement learning networks.

Some examples of the present disclosure put forward a transmission mechanism of the UAV network, that is, each UAV executes a relay/route selection and a power distribution independently. In addition, in the method above, there is no need to set any UAV as the fixed relay nodes, therefore, the utilization efficiency of the UAVs in the UAV network may be greatly improved. Some of the examples of the present disclosure can realize both a relay selection and a power control, which ensures that the UAV network can realize efficient and reliable communications. Therefore, the coverage area of the UAV network can be greatly expended.

Figure 4:
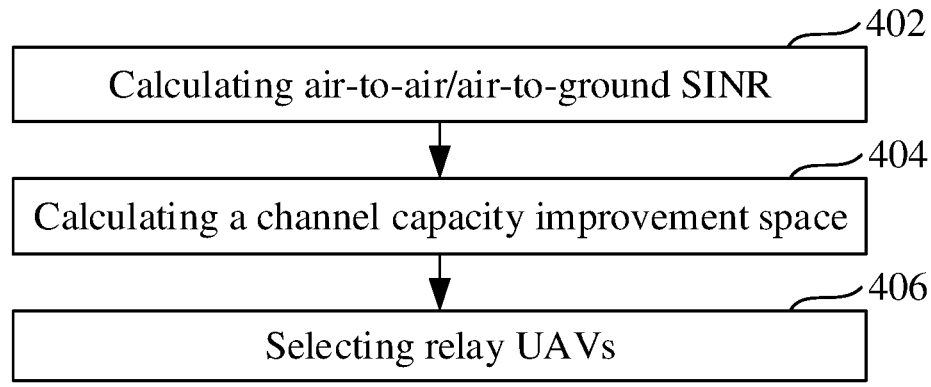
FIG. 4 is a schematic diagram illustrating the flowchart of selecting a UAV subset as a relay set from the UAV network 102 according to one or more examples of the present disclosure.

FIG. 4 is a schematic diagram illustrating the flowchart of selecting a UAV subset as a relay set from the UAV network 102 according to one or more examples of the present disclosure. Examples of the disclosure may select the relay set by weighing channel capacity improvement spaces of each UAV obtained by raising its own transmission power. In the method, the interference between UAVs caused by resource reuse, and differences between air-to-air and air-to-ground channels are taken into consideration.

As shown in FIG. 4, the method may include:

At block 402, a SINR $sinr_{ij-n}^{uu}$ of the $n^{th}$ air-to-air channel from UAV $u_i$ to UAV $u_j$ and a SINR $sinr_{i-n}^{ub}$ of the $n^{th}$ air-to-ground channel from UAV $u_i$ to the base station are determined according to the transmission information.

In examples of the present disclosure, the SINR $sinr_{ij-n}^{uu}$ of the $n^{th}$ air-to-air channel from UAV $u_i$ to UAV $u_j$ may be determined by the following equation (1), wherein, superscript u represents a UAV; superscript b represents a base station. Moreover, the SINR $sinr_{i-n}^{ub}$ of the $n^{th}$ air-to-ground channel from UAV $u_i$ to the base station may be determined by the following equation (2).

$$sinr_{ij-n}^{uu} = \frac{h_{ij,n}^{uu} P_i^n}{\sum_{k \neq j, k \neq i} h_{ik,n}^{uu} P_i^n + P_n} \quad (1)$$

$$sinr_{i-n}^{uu} = \frac{h_{i,n}^{ub} P_i^n}{\sum_{j \neq i} h_{j,n}^{ub} P_i^n + P_n} \quad (2)$$

Wherein, $h_{ij,n}^{uu}$ represents a channel fading coefficient of the $n^{th}$ air-to-air channel from UAV $u_i$ to UAV $u_j$; $h_{i,n}^{ub}$ represents a channel fading coefficient of the $n^{th}$ air-to-ground channel from UAV $u_i$ to the base station; $P_i^n$ represents the transmission power of UAV $u_i$ on the $n^{th}$ air-to-air channel or the $n^{th}$ air-to-ground channel; and $P_n$ represents the noise power.

At block 404, a channel capacity improvement space with respect to each UAV $u_j$ is determined.

In examples of the present disclosure, the channel capacity improvement space may be determined by the following equation (3).

$$c^{idle} = C(w, \sin r^{max}) - C(w, \sin r) \quad (3)$$

Specifically, when UAV $u_i$ connects to the base station directly, the channel capacity improvement space is $c_i^{idle}$; and when UAV $u_i$ connects to a relay UAV $u_j^m$, the uplink capacity improvement space is $\min(c_{i,j}^{idle}, c_j^{idle})$, which is the smaller value of the channel capacity from UAV $u_i$ to relay UAV $u_j^m$ and the channel capacity from the relay UAV $u_j^m$ to the base station.

In some examples of the present application, $C(w, sinr) = w \log(1+sinr)$ is the Shannon formula; $sinr_i^{max}$ is the SINR when UAV $u_i$ transmits with a maximum power $p_{max}$; $sinr_i$ is the SINR when UAV $u_i$ transmits with a power $P_i^t$.

At block 406, selecting M UAVs $u_i^m$, m=1, 2, . . . , M with the largest channel capacity improvement space $c_i^{idle}$ as the relay set according to the channel capacity improvement space $c^{idle}$ calculated. In the above step, M UAVs $u_i^m$ with the largest channel capacity improvement space $c_i^{idle}$ are selected as relay UAVs in the relay set $R_i = \{u_i^m | m=1, 2, . . . , M\}$, wherein i is a pre-determined number of m UAVs.

Through the above steps at blocks 402 to 406, the task of selecting a relay set from the UAV network is accomplished.

Figure 5:
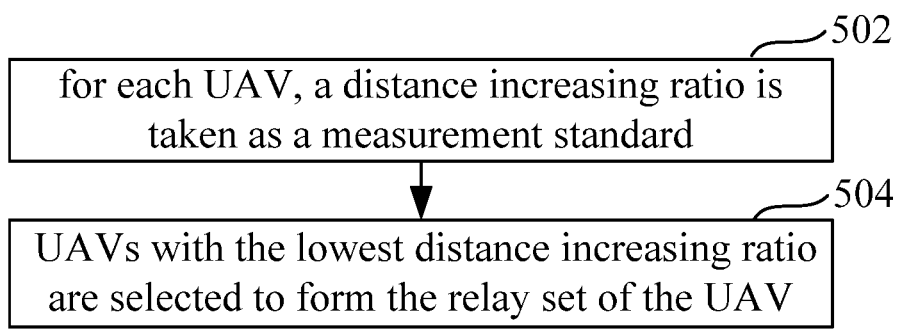
FIG. 5 is a schematic diagram illustrating the flowchart of selecting a UAV subset as a relay set from the UAV network 102 according to some other examples of the present disclosure.

FIG. 5 is a schematic diagram illustrating the flowchart of selecting a UAV subset as a relay set from the UAV network 102 according to some other examples of the present disclosure. Examples of the disclosure may select the relay set by weighing channel capacity improvement space of each UAV obtained by raising its own transmission power. In the method, the interference between UAVs caused by resource reuse and differences between air-to-air channels and air-to-ground channels are taken into consideration.

As shown in FIG. 5, the method may include the following steps.

At step 502, with respect to each UAV $u_j$, a distance increasing ratio $R_{ij}^{dist+}$ is taken as a measurement standard.

In examples of the present disclosure, the distance increasing ratio $R_{ij}^{dist+}$ may be determined by the following equation (4).

$$R_{ij}^{dist+} = \frac{(D_{ij}^{u2r} + D_j^{u2b} - D_i^{u2b})}{D_i^{u2b}} \quad (4)$$

Wherein, $D_{ij}^{u2r}$ represents the distance between UAV $u_i$ and UAV $u_j$; $D_i^{u2b}$ represents the distance between UAV $u_i$ and the base station; $D_j^{u2b}$ represents the distance between UAV $u_j$ and the base station. The distance increasing ratio reflects the increased proportion of the total distance of the selected relay path to the distance of the path when the UAV connects to the base station directly.

At block 504, M UAVs $u_i^m$, m=1, 2, . . . , M with the lowest $R_{ij}^{dist+}$ are selected to form the relay set $R_i = \{u_i^m | m=1, 2, . . . , M\}$ of UAV $u_i$.

In the above methods for selecting relay set, only the transmission information is needed. That is, there is no need to exchange extra information. Therefore, the method has great applicability and extensibility.

Meanwhile, factors such as interference, transmission power and the like can be considered effectively by the method. The feasibility of a UAV serving as a relay node is evaluated by using a channel capacity improvement space or a distance increasing ratio. Moreover, a subset of relay UAVs is selected according to the evaluations of the UAVs. Since the change on the distance is far slower than the change on the channel state or the channel capacity, the relay selection scheme based on the distance increasing ratio has lower requirements on information interaction, is less sensitive to interaction delay and has more stable evaluation indexes. Therefore, whether a UAV is suitable for being used as a relay node can be effectively evaluated.

As mentioned previously, in order to realize the route construction of the UAV network, training on the DQN and the DDPG network are necessary. Wherein, the training process on the DQN and the DDPG network may include two parts: training on parameters of the network (also known as model training) and tuples generation based on action selection.

It should be noted that the training process may be implemented by the base station or a UAV which acts as a central node. In the training process, the base station or the central node would collect information reported by each UAV, train the parameters of the network, and then distribute the trained parameters of the network to other UAVs. The process of tuples generation would be executed by each UAV independently based on the trained parameters of the network distributed by the base station or the central node. Certainly, the training process on the networks can also be executed by each UAV respectively.

Hereinafter, the training process on the DQN and/or the DDPG network according to some examples of the present application will be described in detail.

Figure 6:
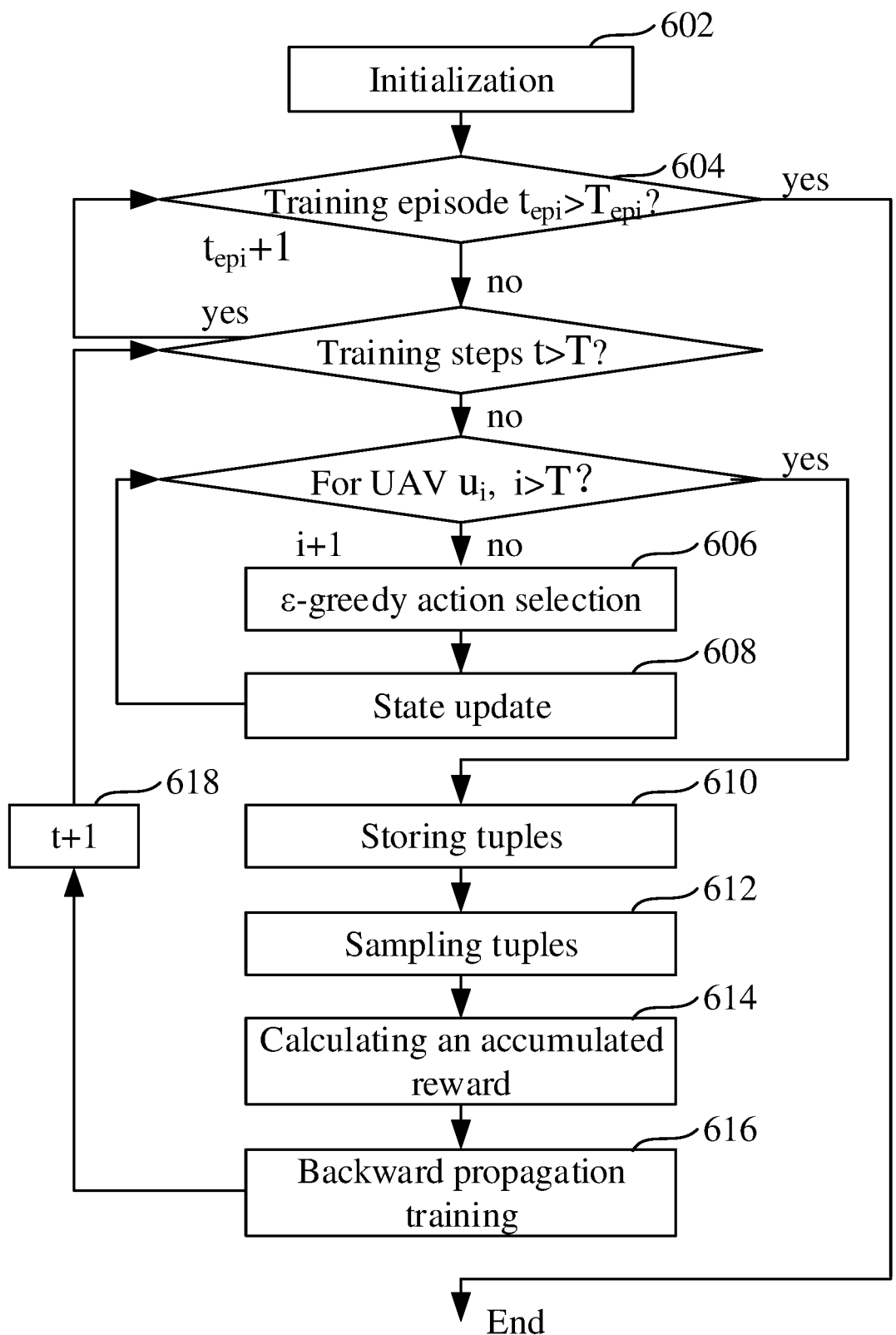
FIG. 6 is a schematic diagram illustrating the flowchart of training the DQN according some examples of the present disclosure.

FIG. 6 is a schematic diagram illustrating the flowchart of training the DQN according some examples of the present disclosure. As shown in FIG. 6, the training process on the DQN may include:

At block 602, the DQN is initialized.

At block 604, the $t_{epi}^{th}$ training episode is started (initialized as $t_{epi}=1$), the number of training steps is initialized as $t=1$, and the environment state parameters $s_i^t$ of the UAV network are updated.

In step 606, the environment state parameters $s_i^t$ are input to the DQN, which outputs an accumulated award $Q(s_i, a_i)$ of each target candidate; then a E-greedy action selection is performed, that is, an action $a_i^t$ (a next-hop target) with the largest accumulated reward $Q(s_i, a_i)$ is selected by a probability 1–ε.

At block 608, the environment state parameters $s_i^{t+1}$ are updated based on the action $a_i^t$ selected, and a reward $r_i^t$ obtained after all UAVs take actions is determined.

At block 610, after executing the steps at blocks 606-608 for each UAV $u_i$, one set of tuples $(s_i^t, a_i^t, r_i^t, s_i^{t+1})$, i=1, 2, . . . , I including a group of actions is recorded and stored in an experience buffer.

At block 612, K sets of tuples are sampled from the experience buffer $(s_{i,k}^t, a_{i,k}^t, r_{i,k}^t, s_{i,k}^{t+1})$, i=1, 2, . . . , I, k=1, 2 . . . K.

Each K sets of tuples include K actions of I UAVs in the same environment. The tuples are used to improve the convergence of the DQN and the performance of self-decision made by multiple UAVs. There are KI tuples in total.

At block 614, an accumulated reward $y_{i,k}^t$ obtained is calculated. If the training episode is terminated, a new training episode will be started, enable $t_{epi}=t_{epi}+1$, and return to block 502. If $t_{epi}>T_{epi}$, the training process is completed.

According to examples of the present disclosure, the accumulated reward $y_{i,k}^t$ may be determined according to the following equation.

$$y_{i,k}^t = \begin{cases} r_{i,k}^t, & \text{if the } k+1^{th} \text{ training episode terminates} \\ r_{i,k}^t + \gamma \max Q(s_{i,k}^{t+1}, a_{i,k}^{t+1}), & \text{else} \end{cases}$$

In some examples of the present disclosure, the condition that the training episode terminates includes: a certain number of UAVs cannot meet the lowest requirement on channel capacity of the control instruction.

At block 616, a backpropagation training is performed to the DQN based on K groups of errors $(y_{i,k}^t - Q(s_{i,k}^{t+1}, a_{i,k}^{t+1}))^2$.

At block 618, update the DQN every L steps. Step number t is updated as t=t+1. If t>T, initialize t=1 and return to block 606. That is, for each UAV $u_i$, the environment state parameters $s_i$ are input to the DQN, which will output the next-hop target with the largest accumulated reward.

Through the above steps at blocks 602-618, the function of route selection can be accomplished based on the DQN.

Figure 7:
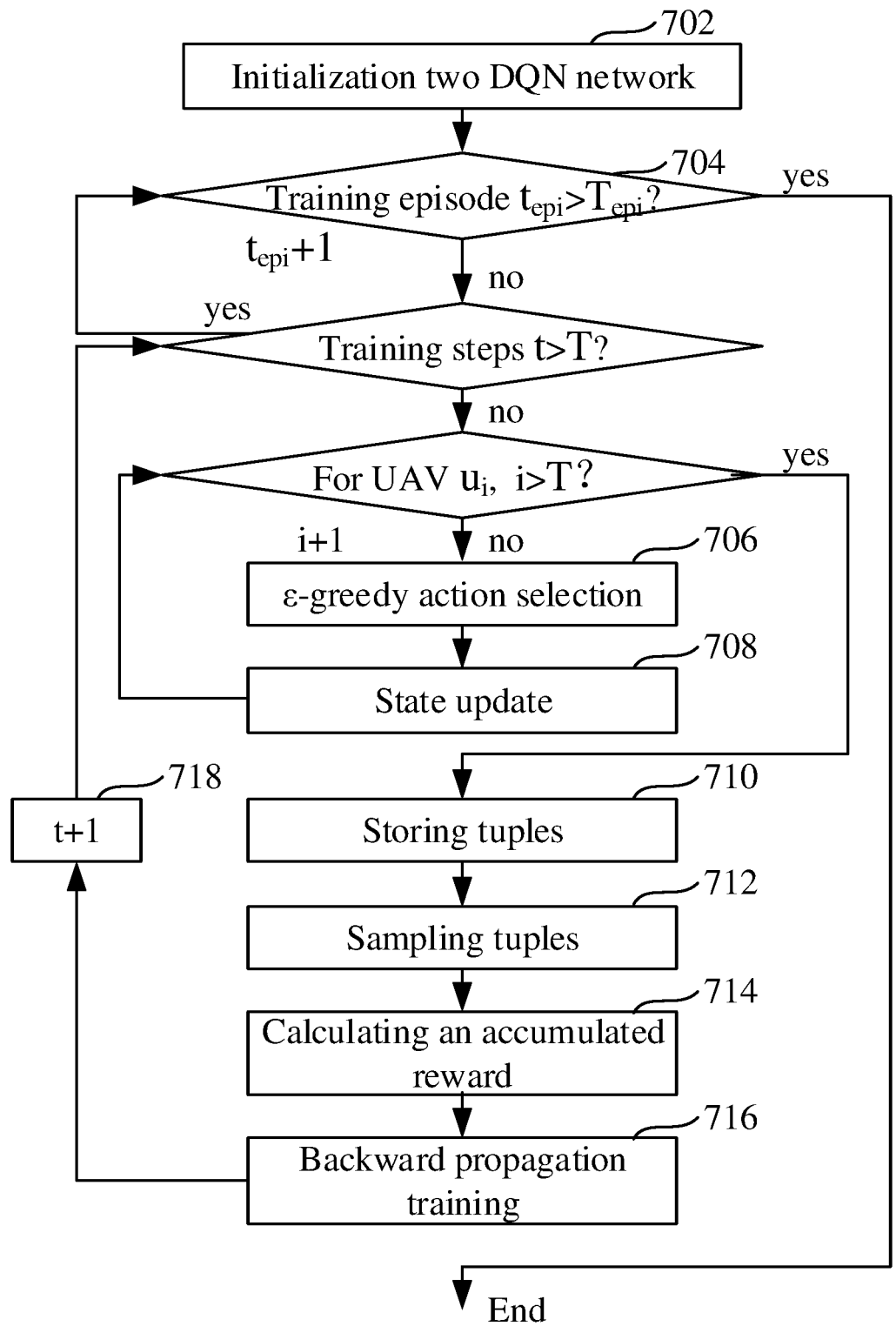
FIG. 7 is a schematic diagram illustrating the flowchart of training the DQN according to some other examples of the present disclosure.

FIG. 7 is a schematic diagram illustrating the flowchart of training the DQN according some other examples of the present disclosure. As shown in FIG. 7, the training process on the DQN may include:

At block 702, two DQNs are initialized, wherein one DQN is an evaluation network with parameters θ, and the other DQN is a target network with parameters θ'.

At block 704, the $t_{epi}^{th}$ training episode is started (initialized as $t_{epi}=1$), the number of training steps is initialized as t=1, and the environment state parameters $s_i^t$ of the UAV network are updated.

At block 706, the environment state parameters $s_i^t$ are input to the DQN network, an accumulated award $Q(s_i, a_i)$ for each target candidate is output, and a ε-greedy action selection is performed, that is, an action $a_i^t$ (next-hop target) with the largest accumulated award $Q(s_i, a_i)$ is selected by a probability 1–ε. The action selected is $a_i^t$.

At block 708, the environment state parameters $s_i^{t+1}$ are updated based on the action $a_i^t$ selected, and a reward $r_i^t$ obtained after all UAVs take actions is determined.

At block 710, after executing the steps at blocks 706-708 for each UAV $u_i$, one set of tuples $(s_i^t, a_i^t, r_i^t, s_i^{t+1})$, i=1, 2, . . . , I including a group of actions is recorded and stored in an experience buffer.

At block 712, K sets of tuples $(s_k^t, a_k^t, r_k^t, s_k^{t+1})$, k=1, 2 . . . K are sampled from the experience buffer.

At block 714, the rewards $Q(s_{i,k}^t, a_{i,k}^t)$ are calculated based on the evaluation network; the rewards $Q'(s_{i,k}^t, a_{i,k}^t)$ and the accumulated reward $y_{i,k}^t$ are calculated based on the target network.

According to examples of the present disclosure, the accumulated reward $y_{i,k}^t$ may be determined according to equation (5).

$$y_{i,k}^t = \begin{cases} r_{i,k}^t, & \text{if the } k+1^{th} \text{ transmission episode terminates} \\ r_{i,k}^t + \gamma \max Q'(s_{i,k}^{t+1}, a_{i,k}^{t+1}), & \text{else} \end{cases} \quad (5)$$

Wherein, the condition that a transmission episode terminates include: the UAV updates the next-hop target, or the current transmission service is complete. The duration of the transmission service complies with an exponential distribution; and the arrival rate complies with a Possion distribution. One training episode may include a plurality of transmission episodes according to the change of the transmission service and the next-hop target. Subsequently, the transmission episode that the DDPG network controls the transmission power and the service model are the same as described above.

At block 716, a back-propagation training on the parameters θ of the evaluation network of the DQN may be carried out based on a mean square error $$\frac{\sum_{k=1}^{K}(y_{i,k}^{t} - Q(s_{i,k}^{t+1}, a_{i,k}^{t+1}))^{2}}{K}$$

of K tuples; and a soft update on the target network of the DQN may be performed.

According to examples of the present disclosure, the soft update may be performed according to the following equation (6).

$$\theta^{Q'} \leftarrow \tau \theta^{Q} + (1-\tau)\theta^{Q'} \qquad (6)$$

Wherein, $\tau \in (0,1)$ is a soft update coefficient.

At block 718, step number is t=t+1. If t>T, initialize t=1 and return to block 704. That is, for each UAV $u_i$, the environment state parameters $s_i$ are input to the DQN, which will output the next-hop target with the largest accumulated reward.

Through the above steps at blocks 702-718, the function of route selection can be implemented based on the DQN.

Examples of the present disclosure provide a solution of route selection using a DQN. Compared with a traditional route selection method, the method disclosed does not need prior model parameters such as data packets, back-off times and the like in a communication environment, thus has great adaptability and expandability. Compared with any existing method for selecting relays based on a DQN, the method disclosed can fully consider transmission tasks of each UAV. Therefore, a UAV can transmit its own data and act as a relay UAV at the same time. That is, the requirement that no fixed relay UAV should be pre-determined can be met. Therefore, the utilization rate of the UAV can be effectively improved.

Figure 8:
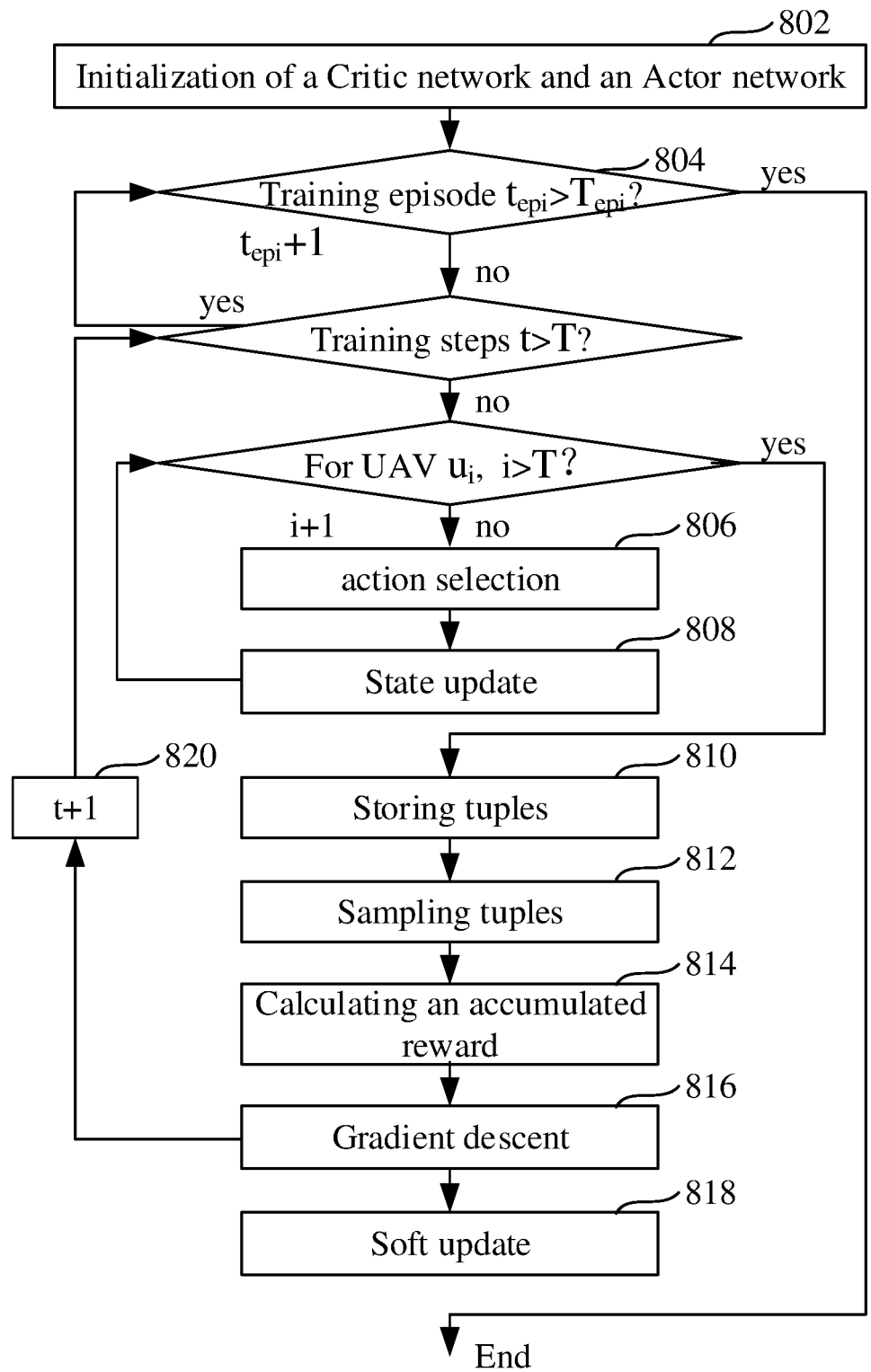
FIG. 8 is a schematic diagram illustrating the flowchart of training the DDPG network according some examples of the present disclosure.

FIG. 8 is a schematic diagram illustrating the flowchart of training the DDPG network according some examples of the present disclosure. As shown in FIG. 8, the training process on the DDPG network may include:

At block 802, a Critic network with parameters $\theta^Q$ and an Actor network with parameters $\theta^\mu$ are initialized.

At block 804, the $t_{epi}^{th}$ training episode is started (initialized as $t_{epi}=1$), the number of training steps is initialized as t=1, and the environment state parameters $s_i^t$ of the UAV network are updated.

At block 806, the environment state parameters $s_i^t$ are input to the Actor network which outputs a transmission power vector $\pi(s_i^t|\theta^\mu)$ of UAV $u_i$ on each channel, an action $a_i^t$ is selected based on the Actor network, and an exploration noise $N_i^t$ is added.

In example of the present disclosure, the action $a_i^t$ selected can be shown as the following equation (7).

$$a_i^t = \pi(s_i^t|\theta^\mu) + N_i^t \qquad (7)$$

At block 808, the environment state parameters $s_i^{t+1}$ are updated based on the action $a_i^t$ selected, and a reward $r_i^t$ obtained after all UAVs take actions is determined.

At block 810, after executing the steps at blocks 806-808 for each UAV $u_i$, one set of tuples $(s_i^t, a_i^t, r_i^t, s_i^{t+1})$, i=1, 2, ..., I including a group of actions is recorded and stored in an experience buffer.

At block 812, K sets of tuples $(s_{i,k}, a_{i,k}^t, r_{i,k}^t, s_{i,k}^{t+1})$, i=1, 2 ... I, k=1, 2 ... K are sampled from the experience buffer.

The K sets of tuples include K actions of I UAVs in the same environment. The tuples are used to improve the convergence of the DDPG network and the performance of self-decision made by multiple UAVs. There are KI tuples in total.

At block 814, an accumulated reward $y_{i,k}^t$ obtained is calculated. If the training episode is terminated, a new training episode will be started, enable $t_{epi}=t_{epi}+1$, and return to block 802. If $t_{epi}>T_{epi}$, the training process is completed.

According to one or more examples of the present disclosure, the accumulated reward $y_{i,k}^t$ may be determined according to equation (8).

$$y_{i,k}^t = \begin{cases} r_{i,k}^t, & \text{if the } k+1^{th} \text{ training episode terminates} \\ r_{i,k}^t + \gamma \max Q(s_{i,k}^{t+1}, a_{i,k}^{t+1}), & \text{else} \end{cases} \qquad (8)$$

In some examples of the present disclosure, the condition that the training episode terminates includes: a certain number of UAVs cannot meet the lowest requirements on channel capacity of the control instruction.

At block 816, a back-propagation training is performed on the Critic network based on K sets of errors $(y_{i,k}^t - Q(s_{i,k}^{t+1}, a_{i,k}^{t+1}))^2$, and the Actor network is updated using a gradient descent method. Wherein, the gradient can be determined according to equation (9).

$$\nabla J \approx \frac{1}{KI} \sum_{i=1}^{KI} \nabla_{a_i} Q(s_i^t, a_i^t|\theta^Q) \nabla_{\theta^\mu} \pi(s|\theta^\mu)|s_i^t \qquad (9)$$

At block 818, the Critic network and the Actor network are soft updated.

$$\theta^{Q'} \leftarrow \tau \theta^{Q} + (1-\tau)\theta Q'$$

$$\theta^{\mu'} \leftarrow \tau \theta^{\mu} + (1-\tau)\theta^{\mu'}$$

Wherein, $\tau \in (0,1)$ is a soft update coefficient.

At block 820, step number t is updated as t=t+1. If t>T, initialize t=1 and return to block 806. That is, for each UAV $u_i$, the environment state parameters $s_i$ are input to the DDPG, which will output the transmission power $P_i^n$ of the UAV $u_i$ on channel n.

Through the above steps at blocks 802-820, the function of power control can be accomplished based on the DDPG network.

Figure 9:
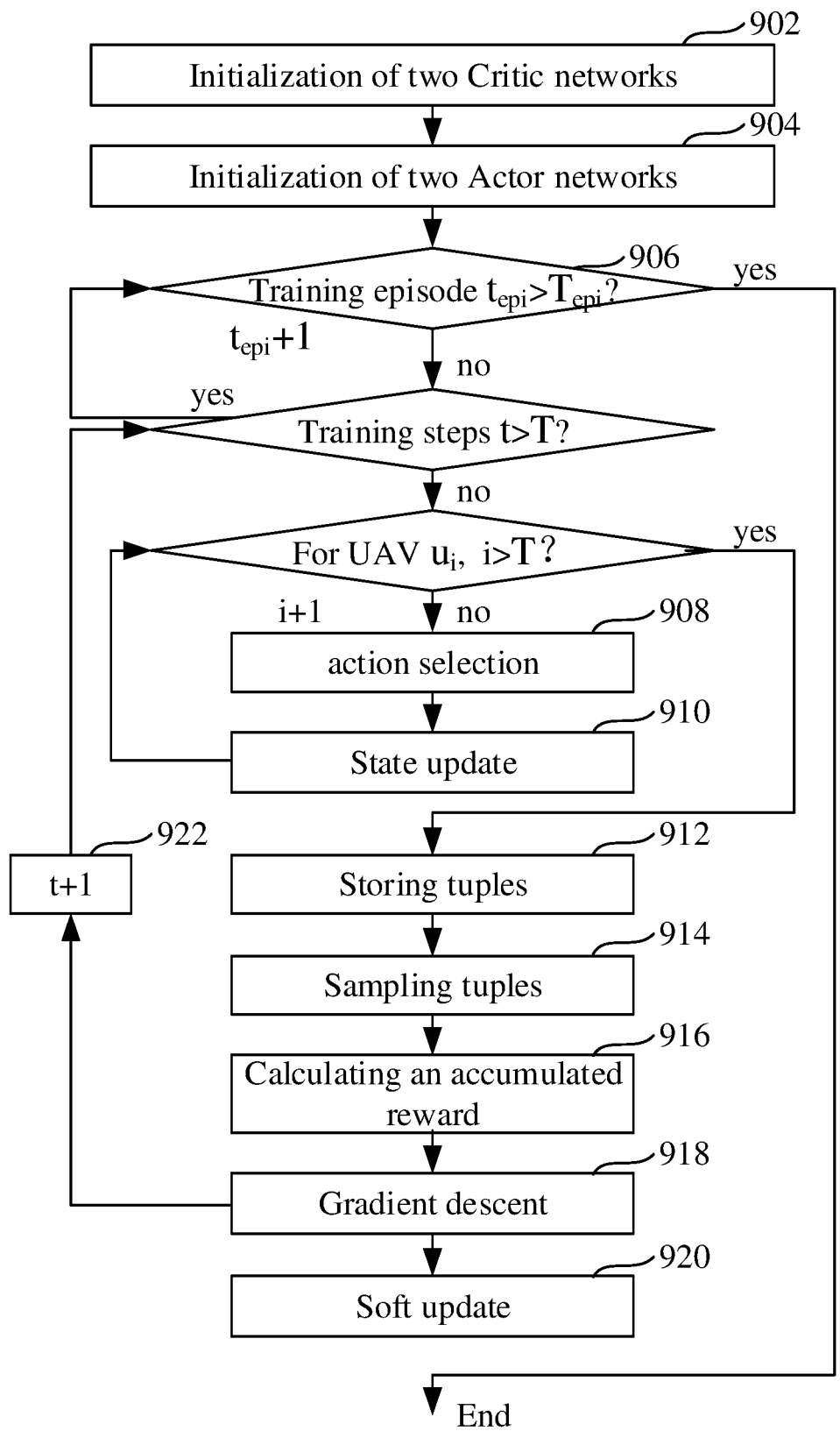
FIG. 9 is a schematic diagram illustrating the flowchart of training the DDPG network according some other examples of the present disclosure.

FIG. 9 is a schematic diagram illustrating the flowchart of training the DDPG network according to some other examples of the present disclosure. As shown in FIG. 9, the training process on the DDPG network may include:

At block 902, two Critic networks are initialized, wherein one Critic network is an evaluation network with parameters $\theta^Q$, and the other Critic network is a target network with parameters $\theta^{Q'}$.

At block 904, two Actor networks are initialized, wherein one Actor network is an evaluation network with parameters $\theta^u$, and the other Actor network is a target network with parameters $\theta^{u'}$.

At block 906, the $t_{epi}^{th}$ training episode is started (initialized as $t_{epi}=1$), the number of training steps is initialized as $t=1$, and the environment state parameters $s_i^t$ of the UAV network are updated.

At block 908, a transmission power vector $a_i^t = \pi(s_i^t | \theta^u)$ is selected based on the evaluation network of the Actor network. Specifically, the environment state parameters $s_i^t$ are input in the evaluation network of the Actor network, which may output a transmission power vector $a_i^t = \pi(s_i^t | \theta^u)$ on each channel, and an exploration noise $N_i^t$ is added.

In examples of the present disclosure, the action $a_i^t$ selected can be shown as the above equation (7).

At block 910, the environment state parameters $s_i^{t+1}$ are updated based on the action $a_i^t$ selected, and a reward $r_i^t$ obtained after all UAVs take actions is determined.

At block 912, after executing the steps at blocks 908-910 for each UAV $u_i$, one set of tuples $(s_i^t, a_i^t, r_i^t, s_i^{t+1})$, $i=1, 2, \ldots, I$ including a group of actions is recorded and stored in an experience buffer.

At block 914, K sets of tuples $(s_{i,k}^t, a_{i,k}^t, r_{i,k}^t, s_{i,k}^{t+1})$, $i=1, 2 \ldots I$, $k=1, 2 \ldots K$ are sampled from the experience buffer. The K sets of tuples include K actions of I UAVs in the same environment. The tuples are used to improve the convergence of the DDPG network and the performance of self-decision made by multiple UAVs. There are KI tuples in total.

At block 916, the rewards $Q(s_{i,k}^t, a_{i,k}^t)$ are calculated based on the evaluation network of the Critic network; the rewards $Q'(s_{i,k}^t, a_{i,k}^t)$ and the accumulated reward $y_{i,k}^t$ are calculated based on the target network of the Critic network.

Wherein, the accumulated reward $y_{i,k}^t$ can be determined by the following equation (10).

$$y_{i,k}^t = \begin{cases} r_{i,k}^t, & \text{if the } k+1^{th} \text{ transmission episode terminates} \\ r_{i,k}^t + \gamma \max Q'(s_{i,k}^{t+1}, a_{i,k}^{t+1}), & \text{else} \end{cases} \quad (10)$$

If the transmission episode is terminated, the training episode may be set as $t_{epi}=t_{epi}+1$ and return to block 902. If $t_{epi}>T_{epi}$, the training process completed.

In examples of the present disclosure, the termination of a transmission episode of the DDPG network is the same as that of the DQN.

At block 918, a back-propagation training on the parameters $\theta^Q$ of the evaluation network of the Critic network may be carried out based on a mean square error $$\frac{\sum_{k=1}^{K} (y_{i,k}^t - Q(s_{i,k}^{t+1}, a_{i,k}^{t+1}))^2}{K}$$

of K sets of tuples, and the parameters $\theta^u$ of the evaluation network of the Actor network may be updated using a gradient descent method. Wherein, the gradient may be determined according to the above equation (9).

At block 920, the target network of the Critic network and the target network of the Actor network are soft updated.

$$\theta^{Q'} \leftarrow \tau \theta^Q + (1-\tau)\theta^{Q'}$$

$$\theta^{u'} \leftarrow \tau \theta^u + (1-\tau)\theta^{u'}$$

Wherein, $\tau \in (0,1)$ is a soft update coefficient.

At block 922, the step number t is updated as $t=t+1$. If $t>T$, initialize $t=1$ and return to block 908. That is, for each UAV $u_i$, the environment state parameters $s_i$ are input to the DDPG network, which will output a transmission power $P_i^n$ of the UAV $u_i$ on channel n.

Through the above steps at blocks 902-922, the function of power control can be accomplished based on the DDPG.

Examples of the present disclosure put forwards solutions of power control based on a DDPG network. Compared with a traditional power control method, the method disclosed does not need prior model parameters such as data packets, back-off times and the like in a communication environment, thus has great adaptability and expandability. In addition, the above method fully considers the communication interference, the state of the UAVs and the state of the relay UAVs. In the method, a UAV can transmit its own data and at the same time act as a relay UAV. Therefore, continuous and fine-grained power control can be realized. Furthermore, the DDPG network does not need to adopt a E-greedy random strategy, so that the transmission reliability of the UAV network can be guaranteed.

Figure 10:
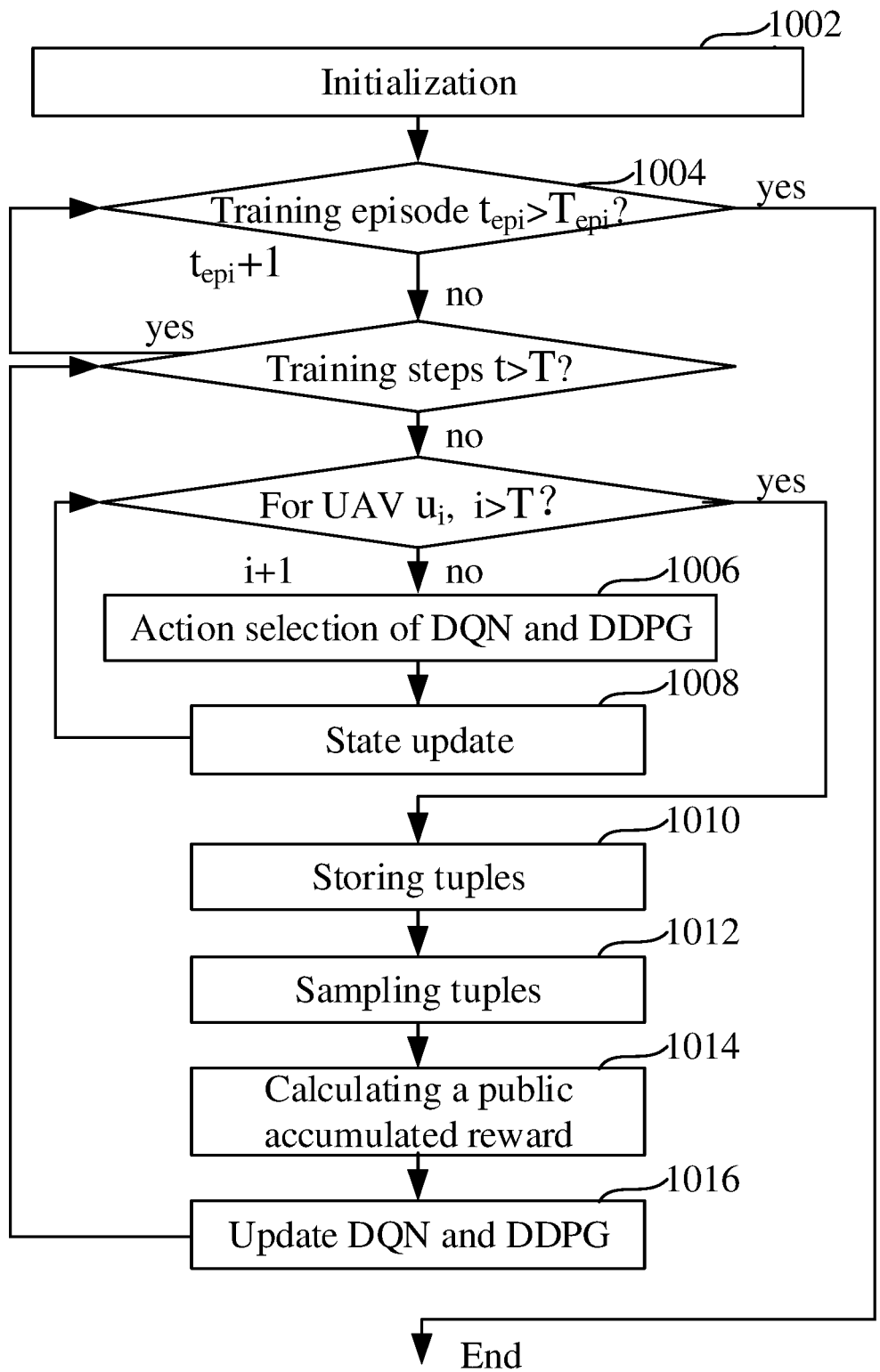
FIG. 10 is a schematic diagram illustrating the flowchart of training the DQN and the DDPG network according some examples of the present disclosure.

FIG. 10 is a schematic diagram illustrating the flowchart of a combined training on the DQN and the DDPG network according some other examples of the present disclosure. As shown in FIG. 10, the combined training process on the DQN and the DDPG network may include:

At blocks 1002-1012, steps at blocks 602-612 or blocks 702-712 of the training process of the DQN are performed and steps at blocks 802-812 or blocks 902-914 of the training process of the DDPG network are performed.

At block 1014, a public accumulated reward $y_{i,k}^t$ is constructed considering the states and public requirements of the DQN and the DDPG network.

This public accumulated reward has generality over the DQN and the DDPG network, so that the DQN and the DDPG network can share part of the reward. In this way, the convergence of the combined training and the simplification of the reinforcement learning models can be guaranteed.

In some examples of the present disclosure, the public accumulated reward $y_{i,k}^t$ can be determined by the following method.

First, a total service request rate $r_{total}=\Sigma_i r_i$ and a total channel capacity $c_{total}=\Sigma_i \Sigma_n c_{i,n}$ of the UAV network are calculated. Then, a total unsatisfied service rate $c_{total}^{outage}=\Sigma_i \max(0, c_{total}^{min} - \Sigma_n c_{i,n}^{uplink})$ and a minimum service request rate $c_{total}^{min}=\Sigma_i c_i^{min}$ are determined. Therefore, the public accumulated reward $r_i$ can be determined as $$r = \max\left(0, \max\left(1, \frac{r_{total}}{c_{total}}\right) - \min\left(0, \lambda\left(\frac{c_{total}^{outage}}{c_{total}^{min}}\right)\right)\right).$$

Wherein, the total channel capacity $c_i^n$ may be determined by the transmission mode taken by the UAV. For example, when the UAV connects to the base station directly, the total channel capacity may be determined as $c_i^n = c_i^n$. Wherein $$\max\left(1, \frac{r_{total}}{c_{total}}\right)$$

reflects how much the requirements of the UAV is satisfied by the current transmission scheme.

$$\min\left(0, \lambda\left(\frac{c_{total}^{outage}}{c_{total}^{min}}\right)\right)$$

reflects the degree of the satisfaction of the UAV in the current transmission scheme. Moreover, λ is a penalty coefficient.

In some other examples of the present disclosure, the reward of the DQN may be $r_{DQN}=r_{total}+r_{relay}$; the reward of the DDPG network may be $r_{DDPG}=r_{total}+r_{power}$.

Firstly, the transmission rate between a UAV and its next-hop target (which can be obtained through a link feedback in the conventional communication system) may be defined as $R_{u2x}$, wherein the service rate of the UAV is $R_{self}$; the relay service rate carried by the UAV or the transmission rate of cached data is $R_{relay}$. In this case, the ratio of the transmission rate of the UAV to the total service request rate may be defined as $$\text{ratio}_{C2R} = \frac{R_{u2x}}{R_{self} + R_{relay}}.$$

The above $r_{total}$ in the reward represents the ratio of actual uplink rate (which can be obtained through a link feedback in the conventional communication system) to the total service request rate $R_{self}+R_{relay}$. The ratio can be taken as a public reward of the DQN and the DDPG network. The public reward may drive the DQN and the DDPG network to cooperate and complete the current transmission task of the UAV.

The above $r_{relay}$ in the reward represents a special reward obtained from the selected relay of the DQN. This special reward can be used to make extra corrections on the relay selection.

$$r_{relay} = \begin{cases} \text{ratio}_{C2R}, & \text{if ratio}_{C2R} < 1 \\ \text{ratio}_{C2R} + (2 - e^{\text{ratio}_{C2R}-\alpha}), & \text{if ratio}_{C2R} \geq 1 \end{cases}$$

When $\text{ratio}_{C2R}<1$, that is, the total service request is not fully completed, there is no special award. When $\text{ratio}_{C2R}\geq 1$, a special award $2-e^{\text{ratio}_{C2R}-\alpha}$ can be obtained. This special award decreases with the increase of $\text{ratio}_{C2R}$, which drives the UAV to select a relay whose actual uplink service rate matches the total service request rate. Wherein, α is a positive parameter, such that $$\lim_{\text{ratio}_{C2R}\to 1} 2 - e^{\text{ratio}_{C2R}-\alpha} = 1,$$

and when $\text{ratio}_{C2R}$ is close to 1 within a certain interval of $\text{ratio}_{C2R}>1$, the load of the relay may be distributed.

The above $r_{power}$ in the reward represents is a special reward obtained from the transmission power selected by the DDPG network. This special reward can be used to make extra corrections on the transmission newer distribution.

$$r_{power} = \begin{cases} \text{ratio}_{C2R}, & \text{if ratio}_{C2R} < 1 \\ \text{ratio}_{C2R} + e^{1-\text{ratio}_{C2R}}, & \text{if ratio}_{C2R} \geq 1 \end{cases}$$

When $\text{ratio}_{C2R}<1$, that is, the total service request is not fully completed, there is no special award. When $\text{ratio}_{C2R}\geq 1$, a special award $e^{1-\text{ratio}_{C2R}}$ can be obtained. This special award decreases with the increase of $\text{ratio}_{C2R}$, which drives the UAV to select a transmission power by which its actual uplink service rate matches the total service request rate (wherein, $r_{DQN}$ and $r_{DDPG}$ can be replaced by $r_i$ in the above training process of the DQN and the DDPG network).

Therefore, in some examples of this specification, the public accumulated reward may be determined based on the reward of the DQN, the reward of the DDPG network, the special reward obtained from the relay selected by the DQN, and the special reward obtained from the transmission power selected by the DDPG network.

At block 1016, steps at blocks 616-618 or blocks 716-718 of the training process of the DQN are performed and steps at blocks 816-820 or blocks 918-922 of the training process of the DDPG network are performed.

The combined training on the DQN and the DDPG network can be realized by the above steps at blocks 1002-1012.

In the above method, a public accumulated reward is constructed considering the states and public requirements of the DQN and the DDPG network. This public accumulated reward has generality over the DQN and the DDPG network, so that the DQN and the DDPG network can share part of the reward. In this way, the convergence of the combined training and the simplification of the deep reinforcement learning models can be guaranteed. The above scheme is a necessary condition for ensuring the convergence of the models and also the simplification of the modules, therefore, should be protected.

Figure 11:
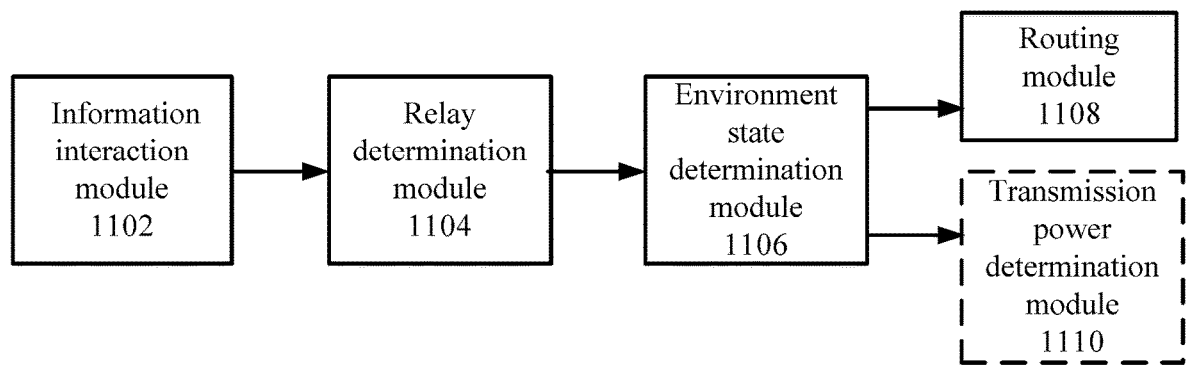
FIG. 11 is a schematic diagram illustrating the internal structure of the UAV according some examples of the present disclosure.

Based on the above method of route construction of the UAV network, one or more examples of the disclosure provide a UAV, which could perform the method of route construction of the UAV network. FIG. 11 is a schematic diagram illustrating the internal structure of a UAV 1100 according to one or more examples of the present disclosure. As shown in FIG. 11, the UAV may include the following module.

An information interaction module 1102, for carrying out information interactions with a base station to obtain transmission information of a UAV network.

In some examples of the present disclosure, the transmission information may include: at least one of positions of the UAVs, a fading coefficient of each air-to-air channel between each two UAVs, a fading coefficient of each air-to-ground channel between each UAV and the base station, a noise power, a service request rate of the UAV, a service rate carried by the UAV or the transmission power of the UAV.

A relay determination module 1104, for determining a relay set based on the transmission information, wherein the relay set comprises at least one UAV.

In some examples of the present disclosure, by the relay determination module 1104, a subset of UAVs can be selected as the relay set of the UAV heuristically from the UAV network. Wherein, each UAV in the relay set may be called as a relay UAV.

In some examples of the present disclosure, the relay determination module 1104 can select a subset of UAVs as the relay set heuristically from the UAV network using the method disclosed in FIG. 4 and FIG. 5.

An environment state determination module 1106, for determining environment state parameters of the UAV network according to the transmission information and the information of the relay set.

A routing module 1108, for inputting the environment state parameters into a DQN to obtain an accumulated reward corresponding to each target candidate, and selecting a target candidate with the largest accumulated reward as a next-hop target.

Through the above modules, each UAV can execute relay selection independently so as to complete the route construction of the UAV network, and each UAV can transmit its own data and at the same time act as a relay. In the method above, there is no need to set any fixed relay nodes. Therefore, the utilization efficiency of the UAVs in the UAV network may be greatly improved.

The UAV may further include the following modules.

A transmission power determination module 1110, for inputting the environment state parameters into a DDPG network to obtain a transmission power of the UAV on each channel.

According to some examples of the present disclosure, the UAV may further include the following module.

A training module, for carrying out a training process on at least one of the DQN or the DDPG network.

Specifically, in some examples of the present disclosure, while performing the training process on the DQN and/or the DDPG network, the environment state parameters of the UAV network may be first updated by the training module. Then, the reward of the action and an action record are obtained according to the updated environment state parameters of the UAV network. Finally, the DQN and/or the DDPG network are trained according to the reward and the action record. In examples of the present disclosure, the training module may adopt any one of the training methods illustrated in FIG. 6, FIG. 7, FIG. 8, FIG. 9 or FIG. 10.

Figure 12:
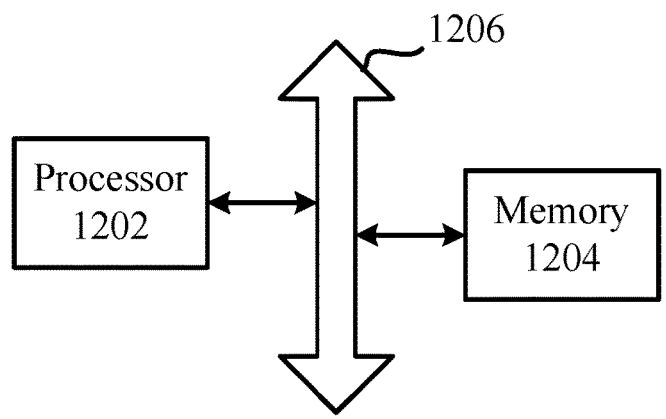
FIG. 12 is a schematic diagram illustrating the internal hardware structure of the UAV according some examples of the present disclosure.

FIG. 12 is a schematic diagram illustrating the internal hardware structure of the UAV according some examples of the present disclosure. As shown in FIG. 12, the UAV may include one or more processors 1202, one or more memories 1204, and a communication bus 1206 configured to couple the one or more processors 1202 and the one or more memories 1204; wherein the one or more memories 1204 store one or more instructions, and when executed by the one or more processors 1202, the instructions cause the one or more processors 1202 to perform the one or more instructions stored in the one or more memories 1204. In some examples of the present disclosure, the one or more process 1202 may perform the one or more instructions stored in the one or more memories 1204 to realize the method of route construction of the UAV network.

In addition, the method may be implemented as a computer program executed by CPU or GPU, the computer program can be stored in a non-volatile computer readable storage medium. When the computer program is executed by CPU or GPU, the function disclosed by the above method may be executed.

One of ordinary skill in the art will appreciate that: the discussion of any of the above examples is merely exemplary and is not intended to imply that the scope of the disclosure, including the claims, is limited to these examples; the above examples or technical features in different examples may also be combined under the idea of the disclosure, the steps may be implemented in any order, and there are many other variations of different aspects of the disclosure as described above, which are not provided in detail for the sake of brevity.

The present examples are intended to embrace all such alternatives, modifications and variances that fall within the broad scope of the appended claims. Therefore, it is intended that any omissions, modifications, equivalents, improvements and the like be included within the spirit and scope of the present disclosure.

One of ordinary skill in the art will appreciate that: the discussion of any of the above examples is merely exemplary and is not intended to imply that the scope of the disclosure, including the claims, is limited to these examples; the above examples or technical features in different examples may also be combined under the idea of the disclosure, the steps may be implemented in any order, and there are many other variations of different aspects of the disclosure as described above, which are not provided in detail for the sake of brevity.

In addition, well-known power/ground connections to integrated circuit (IC) chips and other components may or may not be shown in the figures provided for simplicity of illustration and discussion and to not obscure the present disclosure. Furthermore, means may be shown in block diagram form in order to avoid obscuring the disclosure, and this also takes into account the fact that details regarding implementations of such block diagram means are highly dependent on the platform in which the disclosure is to be implemented (i.e., such details should be well within the purview of one skilled in the art). While specific details (e.g., circuits) have been set forth in order to describe exemplary examples of the application, it will be apparent to those skilled in the art that the application may be practiced without these specific details or with variations of these specific details. Accordingly, the description is to be regarded as illustrative in nature, and not as restrictive.

While the disclosure has been described in conjunction with specific examples thereof, many alternatives, modifications and variations thereof will be apparent to those skilled in the art in light of the foregoing description. For example, other memory architectures (e.g., dynamic RAM (DRAM)) may use the examples discussed.

The present examples are intended to embrace all such alternatives, modifications and variances that fall within the broad scope of the appended claims. Therefore, it is intended that any omissions, modifications, equivalents, improvements and the like be included within the spirit and scope of the present disclosure.

What is claimed is:

1. A method of route construction of an unmanned aerial vehicle (UAV) network, implemented by a UAV, comprising:

obtaining transmission information of the UAV network;

determining a relay set of the UAV from the UAV network based on the transmission information; wherein, the relay set comprises at least one UAV;

determining environment state parameters according to the transmission information and information of the relay set;

inputting the environment state parameters into a Deep Q-Learning Network (DQN) to obtain an accumulated reward corresponding to each target candidate; and selecting a target candidate with the largest accumulated reward as a next-hop target of the UAV:

wherein, determining a relay set of UAV $u_i$ from the UAV network comprises:

taking a distance increasing ratio $R_{ij}^{dist+}$ as a measurement standard for each UAV $u_i$; and selecting M UAVs $u_i^m$, m=1, 2, ..., M with the lowest $R_{ij}^{dist+}$ to form the relay set $R_i = \{u_i^m | m=1, 2, ..., M\}$ of UAV $u_i$, wherein M is a predetermined number of relay UAVs.

2. The method of claim 1, wherein, the distance increasing ratio $R_{ij}^{dist+}$ is determined according to:

$$R_{ij}^{dist+} = \frac{(D_{ij}^{u2r} + D_j^{u2b} - D_i^{u2b})}{D_i^{u2b}}$$

wherein, $D_{ij}^{u2r}$ represents the distance between UAV $u_i$ and UAV $u_j$; $D_i^{u2b}$ represents the distance between UAV $u_1$ and the base station; $D_i^{u2b}$ represents the distance between the UAV $u_i$ and the base station.

3. The method of claim 1, further comprising: training the DQN, which comprises:
   initializing a DQN, starting the $t_{epi}^{th}$ training episode, initializing the number of training steps as t=1, and updating the environment state parameters $t_i^t$ of the UAV network;
   inputting the environment state parameters $t_i^t$ to the DQN which outputs an estimate accumulated reward $Q(s_i, a_i)$ of each UAV, and performing a ε-greedy action selection to select an action $a_i^t$ for each UAV;
   updating the environment state parameters $s_i^{t+1}$ based on the action $a_i^t$ selected, and calculating a reward obtained $r_i^t$ of each UAV after all UAVs take actions;
   recording a set of tuples $(s_i^t, a_i^t, r_i^t, s_i^{t+1})$, i=1, 2, ..., I, and storing the set of tuples into an experience buffer;
   sampling K sets of tuples $(s_{i,k}^t, a_{i,k}^t, r_{i,k}^t, s_{i,k+1}^{t+1})$, i=1, 2 .... I, k=1, 2 .... K from the experience buffer; and
   calculating an accumulated reward obtained $y_{i,k}^t$, if the training episode is terminated, then restarting a new training episode, enabling $t_{epi}=t_{epi}+1$, and returning to the beginning of a training episode, and if $t_{epi}>T_{epi}$, the training process is completed.

4. The method of claim 3, wherein, initializing the DQN comprises:
   initializing two DQNs, wherein one DQN is an evaluation network with parameters θ, and the other DQN is a target network with parameters θ';
   the accumulated reward $y_{i,k}^t$ is determined according to:

$$y_{i,k}^t = \begin{cases} r_{i,k}^t, & \text{if the } k+1^{th} \text{ transmission episode terminates} \\ r_{i,k}^t + \gamma \max Q'(s_{i,k}^{t+1}, a_{i,k}^{t+1}), & \text{else} \end{cases}$$

wherein, the condition that a transmission episode terminates is: the UAV updates the next-hop target or the current transmission service is finished.

5. The method of claim 4, further comprising:
   carrying out a back propagation training on the parameters θ of the evaluation network of the DQN based on a mean square error $$\frac{\sum_{k=1}^{K}(y_{i,k}^t - Q(s_{i,k}^{t+1}, a_{i,k}^{t+1}))^2}{K}$$

of K sets of actions; and
   performing a soft update on the target network of the DQN.

6. The method of claim 3, wherein, the accumulated reward $y_{i,k}^t$ is determined according to:

$$y_{i,k}^t = \begin{cases} r_{i,k}^t, & \text{if the } k+1^{th} \text{ training episode terminates} \\ r_{i,k}^t + \gamma \max Q(s_{i,k}^{t+1}, a_{i,k}^{t+1}), & \text{else} \end{cases}$$

wherein, the condition that the training episode terminates comprises: a certain number of UAVs cannot meet the lowest requirements on channel capacity of the control instruction;
the method further comprises:
performing a back-propagation training to the DQN based on K groups of errors $(y_{i,k}^t - Q(s_{i,k}^{t+1}, a_{i,k}^{t+1}))^2$.

7. The method of claim 1, further comprising: inputting the environment state parameters into a Deep Deterministic Policy Gradient (DDPG) network to obtain transmission powers on each channel.

8. The method of claim 7, further comprising: training the DDPG network, which comprises:
   initializing a Critical network and an Actor network of the DDPG network;
   starting the $t_{epi}^{th}$ training episode, initializing the number of training steps as t=1, and updating the environment state parameters $s_i^t$ of the UAV network;
   selecting a transmission power vector as an action $a_i^t$ based on the Actor network;
   updating the environment state parameters $s_i^{t+1}$ based on the action $a_i^t$ selected, and determining a reward $r_i^t$ after all UAVs take actions;
   recording a set of tuples $(s_i^t, a_i^t, r_i^t, s_i^{t+1})$, i=1, 2, ..., I, and storing the set of actions into a experience buffer;
   sampling K sets of tuples $(s_{i,k}^t, a_{i,k}^t, r_{i,k}^t, s_{i,k+1}^{t+1})$, i=1, 2 .... I, k=1, 2 .... K from the experience buffer; and
   calculating an accumulated reward $y_{i,k}^t$, if the training episode is terminated, restarting a new training episode, enabling $t_{epi}=t_{epi}+1$, and returning to the beginning of a training episode, and if $t_{epi}>T_{epi}$, outputting the transmission powers of each UAV on each channel.

9. The method of claim 8, wherein, initializing a Critical network and an Actor network in the DDPG network comprises:
   initializing two Critical networks, wherein one is an evaluation network of the Critical network with parameters $\theta^Q$, and the other is a target network of the Critical network with parameters $\theta^{Q'}$; and initializing two Actor networks, wherein one is an evaluation network of the Actor network with parameters $\theta^\mu$, the other is a target network of the Actor network with parameters $\theta^{\mu'}$;
   calculating an accumulated reward $y_{i,k}^t$ comprises:
   calculating $Q(s_{i,k}^t, a_{i,k}^t)$ based on the evaluation network of the Critic network, calculating $Q'(s_{i,k}^t, a_{i,k}^t)$ and the accumulated reward $y_{i,k}^t$ based on the target network of the Critic network;
   wherein, the accumulated reward $y_{i,k}^t$ is determined according to:

$$y_{i,k}^t = \begin{cases} r_{i,k}^t, & \text{if the } k+1^{th} \text{ transmission episode terminates} \\ r_{i,k}^t + \gamma \max Q'(s_{i,k}^{t+1}, a_{i,k}^{t+1}), & \text{else} \end{cases}$$

wherein, the condition that a transmission episode terminates comprises: the UAV updates the next-hop target or the current transmission service is finished.

10. The method of claim 9, further comprising:
performing a back-propagation training on the parameters θ of the evaluation network of the Critic network based on a mean square error $$\frac{\sum_{k=1}^{K}(y_{i,k}^{t}-Q(s_{i,k}^{t+1},a_{i,k}^{t+1}))^{2}}{K}$$

of K sets of actions;

updating the parameters $\theta^u$ of the evaluation network of the Actor network using a gradient descent method; and performing a soft update on the Critic target network and the Actor target network.

11. The method of claim 8, wherein, the accumulated reward $y_{i,k}^{t}$ is determined according to:

$$y_{i,k}^{t} = \begin{cases} r_{i,k}^{t}, & \text{if the } k+1^{th} \text{ training episode terminates} \\ r_{i,k}^{t} + \gamma \max Q(s_{i,k}^{t+1}, a_{i,k}^{t+1}), & \text{else} \end{cases}$$

wherein, the condition that the training episode terminates comprises: a certain number of UAVs cannot meet the lowest channel capacity requirement of the control instruction.

12. The method of claim 11, further comprising:

carrying out a back-propagation training on the Critic network based on error $(y_{i,k}^{t}-Q(s_{i,k}^{t+1},a_{i,k}^{t+1}))^2$ of K groups;

updating the Actor network by using a gradient descent method; and carrying out soft update on the Critic network and the Actor network.

13. The method of claim 7, further comprising:

training the DQN and the DDPG network, which comprises:

initialize the DQN, and a Critic network and an Actor network in the DDPG network;

starting the $t_{epi}^{th}$ training episode, initializing the number of training steps to be t=1, and updating the environment state parameters $s_i^t$ of the UAV network;

inputting the environment state parameters $s_i^t$ to the DQN which outputs an accumulated reward $Q(s_i, a_i)$ of each target candidate, and performing a ε-greedy action selection;

inputting the environment state parameters $s_i^t$ to the Actor network which outputs a transmission power vector $\pi(s_i^t|\theta^u)$ on each channel, selecting an action $a_i^t$ based on the Actor network, and adding an exploration noise $N_i^t$;

updating the environment state parameters $s_i^t$ based on the action $a_i^t$ selected, and determining a reward obtained $r_i^t$ after all UAVs take actions;

recording a set of tuples $(s_i^t, a_i^t, r_i^t, s_i^{t+1})$, i=1, 2, ..., I, and storing the set of tuples into an experience buffer;

sampling K sets of tuples $(s_{i,k}^t, a_{i,k}^t, r_{i,k}^t, s_{i,k+1}^{t+1})$, i=1, 2 ... I, k=1,2 ... K from experience buffer;

calculating a public accumulated reward $y_{i,k}^t$;

if the training episode is terminated, restarting a new training episode, enabling $t_{epi}=t_{epi}+1$, returning to the beginning of a training episode and the Critical network and the Actor network in the DDPG network, and if $t_{epi} > T_{epi}$, the training is completed.

14. An unmanned aerial vehicle (UAV), comprising:

one or more processors, one or more memories, and a communication bus configured to couple the one or more processors and the one or more memories; wherein the one or more memories store one or more instructions, and when executed by the one or more processors, the instructions cause the one or more processors to perform the method according to claim 1.

15. A non-transitory computer-readable storage medium, comprising one or more instructions, when executed by one or more processors, cause the one or more processors to perform the method according to claim 1.

16. A method of route construction of an unmanned aerial vehicle (UAV) network, implemented by a UAV, comprising:

obtaining transmission information of the UAV network;

determining a relay set of the UAV from the UAV network based on the transmission information; wherein, the relay set comprises at least one UAV;

determining environment state parameters according to the transmission information and information of the relay set;

inputting the environment state parameters into a Deep Q-Learning Network (DQN) to obtain an accumulated reward corresponding to each target candidate; and selecting a target candidate with the largest accumulated reward as a next-hop target of the UAV;

wherein, determining a relay set of UAV $u_i$ from the UAV network comprises:

determining a signal to interference plus noise ratio (SINR) of the $n^{th}$ air-to-air channel from UAV $u_i$ to UAV $u_j$ and a SINR of the $n^{th}$ air-to-ground channel from UAV $u_i$ to the base station according to the transmission information;

determining a channel capacity improvement space of UAV $u_i$ with respect to each UAV $u_j$ according to the SINRs determined; and selecting M UAVs with the largest channel capacity improvement space as relay UAVs of UAV $u_i$, wherein M is a predetermined number of relay UAVs.

17. The method of claim 16, wherein, the SINR $sinr_{ij-n}^{uu}$ of the $n^{th}$ air-to-air channel from UAV $u_i$ to UAV $u_j$ is determined according to:

$$sinr_{ij-n}^{uu} = \frac{h_{ij,n}^{uu}P_i^n}{\sum_{k \neq j, k \neq i}h_{ik,n}^{uu}P_i^n + P_n}$$

the SINR $sinr_{i-n}^{ub}$ of the $n^{th}$ air-to-ground channel from the UAV $u_i$ to the base station is determined according to:

$$sinr_{i-n}^{uu} = \frac{h_{i,n}^{ub}P_i^n}{\sum_{j \neq i}h_{j,n}^{ub}P_i^n + P_n}$$

wherein, $h_{ij,n}^{uu}$ represents a channel fading coefficient of the $n^{th}$ air-to-air channel from UAV $u_i$ to UAV $u_j$; $h_{i,n}^{ub}$ represents a channel fading coefficient of the $n^{th}$ air-to-ground channel from UAV $u_i$ to the base station; $P_i^n$ represents the transmission power of UAV $u_i$ on the $n^{th}$ air-to-air channel or the $n^{th}$ air-to-ground channel; and $P_n$ represents the noise power.

18. The method of claim 16, wherein, the channel capacity improvement space is determined according to:

$$c_i^{idle} = C(w, sinr_i^{max}) - C(w, sinr_i)$$

wherein, $C(w, sinr) = w\log(1+sinr)$ is the Shannon formula; $sinr_i^{max}$ is the SINR when UAV $u_i$ is transmitting with a maximum power $p_{max}$; $sinr_i$ is the SINR when UAV $u_i$ is transmitting with a power $u_i$.

19. The method of claim 18, wherein, when UAV $u_i$ connects to the base station directly, the channel capacity improvement space is $c_i^{idle}$; and when UAV $u_i$ connects to a relay UAV $u_j^m$, the channel capacity improvement space is $\min(c_{i,j}^{idle}, c_j^{idle})$, which is the smaller value of the channel capacity from UAV $u_i$ to relay UAV $u_j^m$ and the channel capacity from relay UAV $u_j^m$ to the base station.

* * * * *